United States Patent
Yang et al.

(10) Patent No.: US 12,238,592 B2
(45) Date of Patent: Feb. 25, 2025

(54) NEIGHBOR CELL MEASUREMENT WITH POWER SAVING

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 17/661,731

(22) Filed: May 2, 2022

(65) Prior Publication Data

US 2023/0354111 A1    Nov. 2, 2023

(51) Int. Cl.
*H04W 36/00* (2009.01)
*H04W 76/20* (2018.01)

(52) U.S. Cl.
CPC ... *H04W 36/0058* (2018.08); *H04W 36/0061* (2013.01); *H04W 36/00837* (2018.08); *H04W 76/20* (2018.02)

(58) Field of Classification Search
CPC ........ H04W 36/0058; H04W 36/0061; H04W 36/00837; H04W 76/20; H04W 36/0094; Y02D 30/70

See application file for complete search history.

(56) References Cited

U.S. PATENT DOCUMENTS

| | | | | |
|---|---|---|---|---|
| 2015/0189526 A1* | 7/2015 | Yang | ...................... | H04J 11/005 370/252 |
| 2015/0215856 A1* | 7/2015 | Kim | ...................... | H04W 48/16 370/252 |
| 2020/0077312 A1* | 3/2020 | Tsuboi | ................. | H04B 17/309 |
| 2022/0014943 A1* | 1/2022 | Zhang | ............... | H04W 36/0085 |

* cited by examiner

*Primary Examiner* — Steven Hieu D Nguyen
(74) *Attorney, Agent, or Firm* — Procopio, Cory, Hargreaves & Savitch LLP

(57) ABSTRACT

A user equipment (UE) measures a first measurement on a first serving cell or a first serving beam using at least one of a first receiver or a first measurement configuration with higher gain and power consumption. The UE measures a second measurement on one or more neighbor cells or one or more non-serving beams using at least one of a second receiver or a second measurement configuration with lower gain and power consumption, the second receiver being different than the first receiver or the second measurement configuration being different than the first measurement configuration. The UE transmits a measurement report to a network node based on the first measurement and the second measurement, selects a second serving cell or second serving beam based on the first measurement and the second measurement based on a rank, or ranks cells or beams based on the first measurement and the second measurement.

30 Claims, 15 Drawing Sheets

NEIGHBOR CELL MEASUREMENT WITH POWER SAVING

TECHNICAL FIELD

The present disclosure relates generally to communication systems, and more particularly, to wireless communication including neighbor cell measurements.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus measures a first measurement on a first serving cell or a first serving beam using at least one of a first receiver or a first measurement configuration with a higher gain and a higher power consumption than a second receiver or a second measurement configuration. The apparatus measures a second measurement on one or more neighbor cells or one or more non-serving beams using at least one of the second receiver or the second measurement configuration with a lower gain and a lower power consumption than the first receiver or the first measurement configuration, the second receiver being different than the first receiver or the second measurement configuration being different than the first measurement configuration. The apparatus transmits a measurement report to a network node based on the first measurement and the second measurement, selects a second serving cell or a second serving beam based on the first measurement and the second measurement based on a rank, or ranks cells or beams based on the first measurement and the second measurement.

In an aspect of the disclosure, a method, a computer-readable medium, and an apparatus are provided for wireless communication at a network node. The apparatus obtains an indication of support of a UE for a measurement capability including a use of a different receiver or a same receiver and a different measurement configuration with a lower gain and a lower power consumption than a first receiver or a first measurement configuration for first measurements on a serving cell or a serving beam and second measurements on one or more neighbor cells or one or more non-serving beams. The apparatus outputs for transmission a configuration that enables or disables the measurement capability at the UE.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
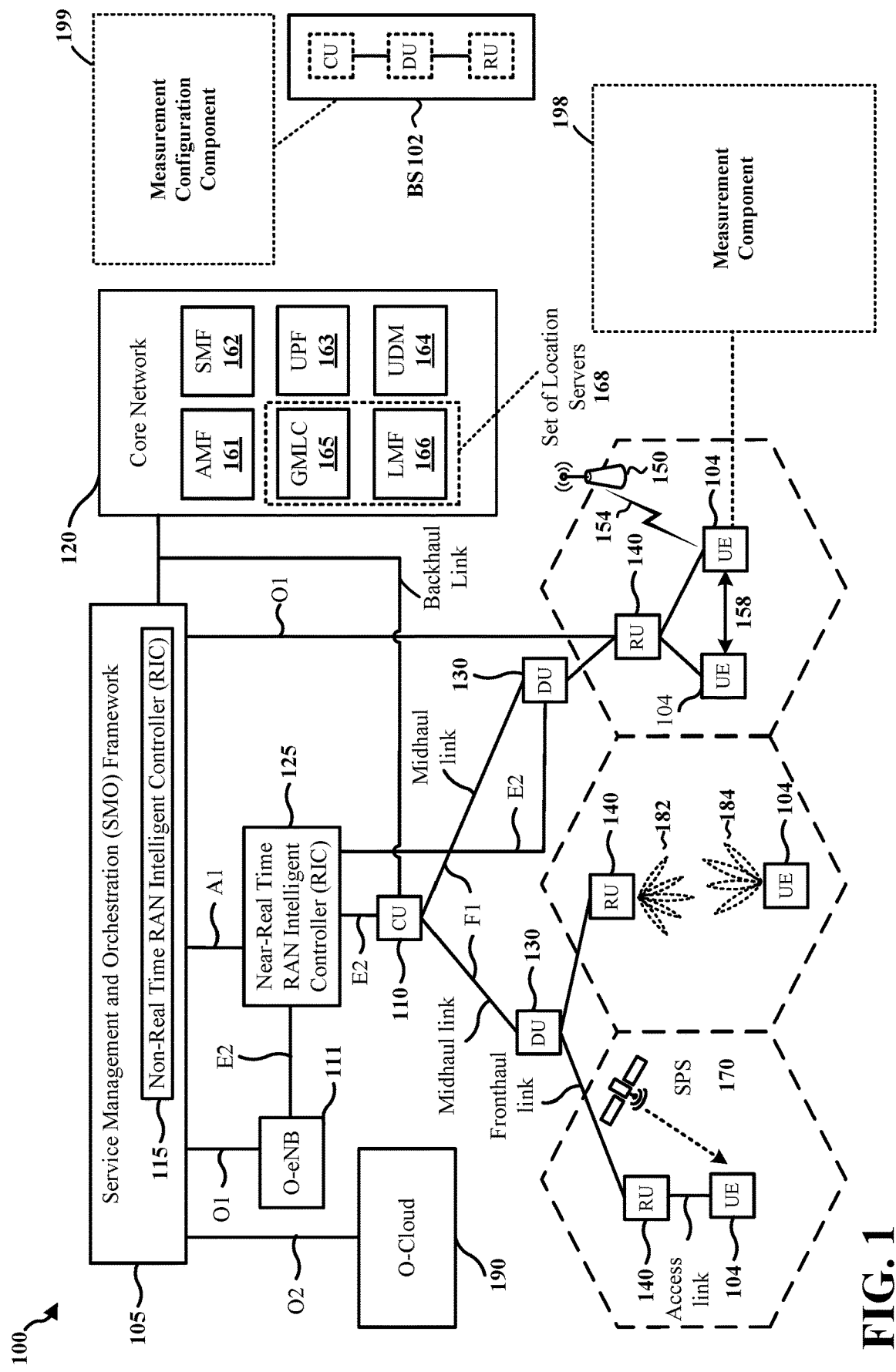
FIG. 1 is a diagram illustrating an example of a wireless communications system and an access network, in accordance with various aspects of the present disclosure.

A UE may perform measurements to compare a serving cell to a neighbor cell and/or to compare a serving beam to a non-serving beam. In order to perform the measurements, the UE may repeatedly perform cell measurements and/or beam measurements, which consumes power at the UE. A UE may rely on battery power, power saving techniques for the cell measurements and/or beam measurements may be helpful to the UE in conserving power, including UEs communicating based on a mmW.

Aspects presented herein provide for a UE to use a different radio (e.g., a first, higher power radio or a lower power radio) to measure a serving cell than to measure neighbor cells. Similarly, aspects presented herein provide for a UE to use a different radio (e.g., a first, higher power radio or a lower power radio) to measure a serving beam than to measure a non-serving beam. Aspects presented herein provide for coordination between the UE and the network about the use of a different receiver and/or different measurement parameters in order to allow for the power saving benefits at the UE while maintaining mobility performance, handover without added delay, and avoiding dropped calls.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), flash memory, phase change memory, optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR B S, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (MC) 125 via an E2 link, or a Non-Real Time (Non-RT) MC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit wireless signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a measurement component 198 configured to measure a first measurement on a first serving cell or a first serving beam using at least one of a first receiver or a first measurement configuration with a higher power consumption than a second receiver or a second measurement configuration and measure a second measurement on one or more neighbor cells or one or more non-serving beams using at least one of the second receiver or the second measurement configuration with a lower gain and a lower power consumption than the first receiver or the first measurement configuration, the second receiver being different than the first receiver or the second measurement configuration being different than the first measurement configuration. The measurement component 198 may be configured to perform at least one of transmitting a measurement report to a network node based on the first measurement and the second measurement, selecting a second serving cell or a second serving beam based on the first measurement and the second measurement based on a rank, or ranking cells or beams based on the first measurement and the second measurement.

In an aspect of the disclosure, a network node such as a base station 102 or a component of the base station 102 such as a CU 110, DU 130, or RU 140, may include a measurement configuration component 199 configured to obtain an indication of support of a UE for a measurement capability including a use of a different receiver or a same receiver and a different measurement configuration with a lower gain and a lower power consumption than a first receiver or a first measurement configuration for first measurements on a serving cell or a serving beam and second measurements on one or more neighbor cells or one or more non-serving beam. The measurement configuration component 199 outputs for transmission a configuration that enables or disables the measurement capability at the UE.

Although the following description may be focused on 5G NR, the concepts described herein may be applicable to other similar areas, such as LTE, LTE-A, CDMA, GSM, and other wireless technologies.

Figure 2:
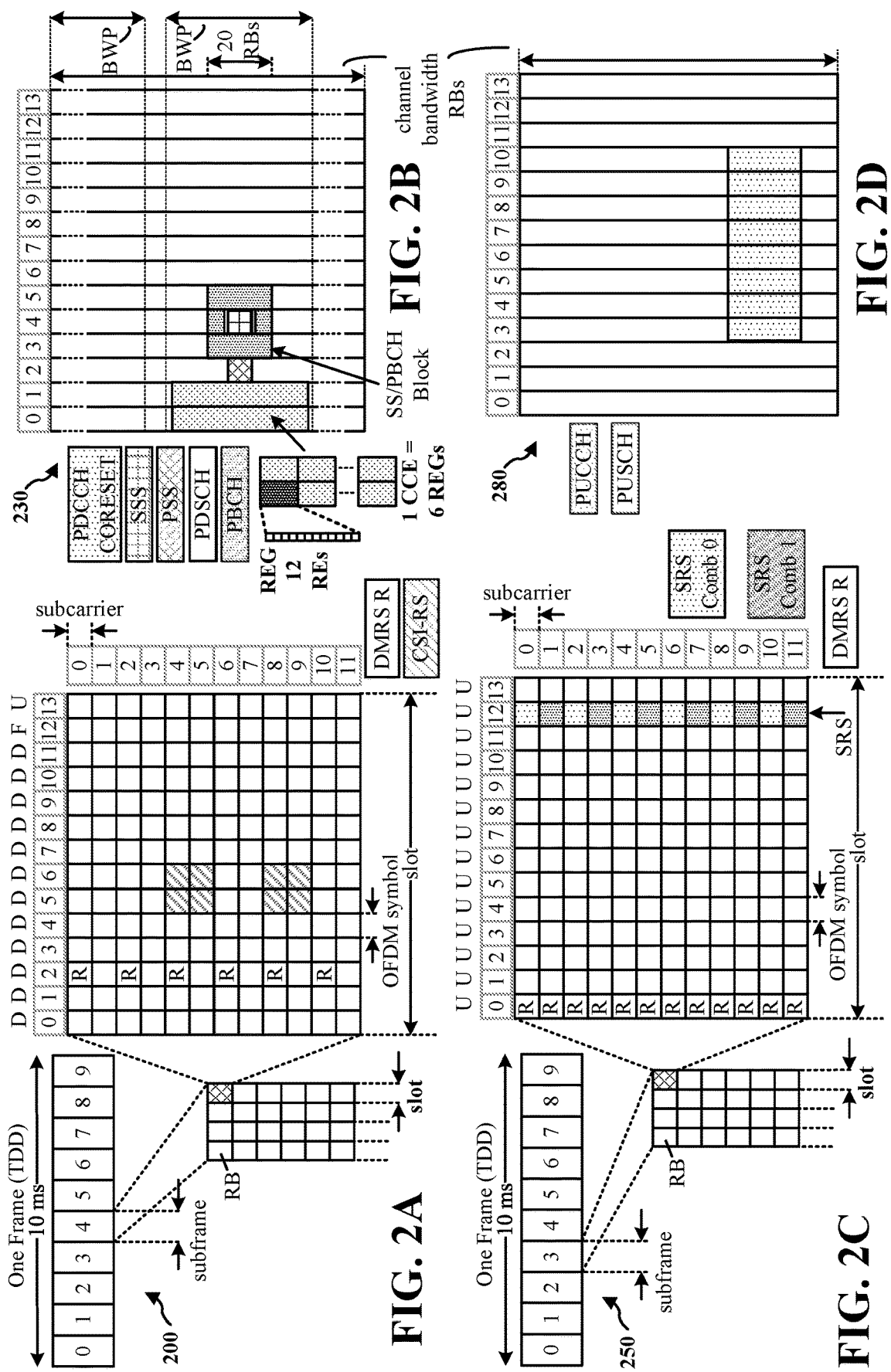
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
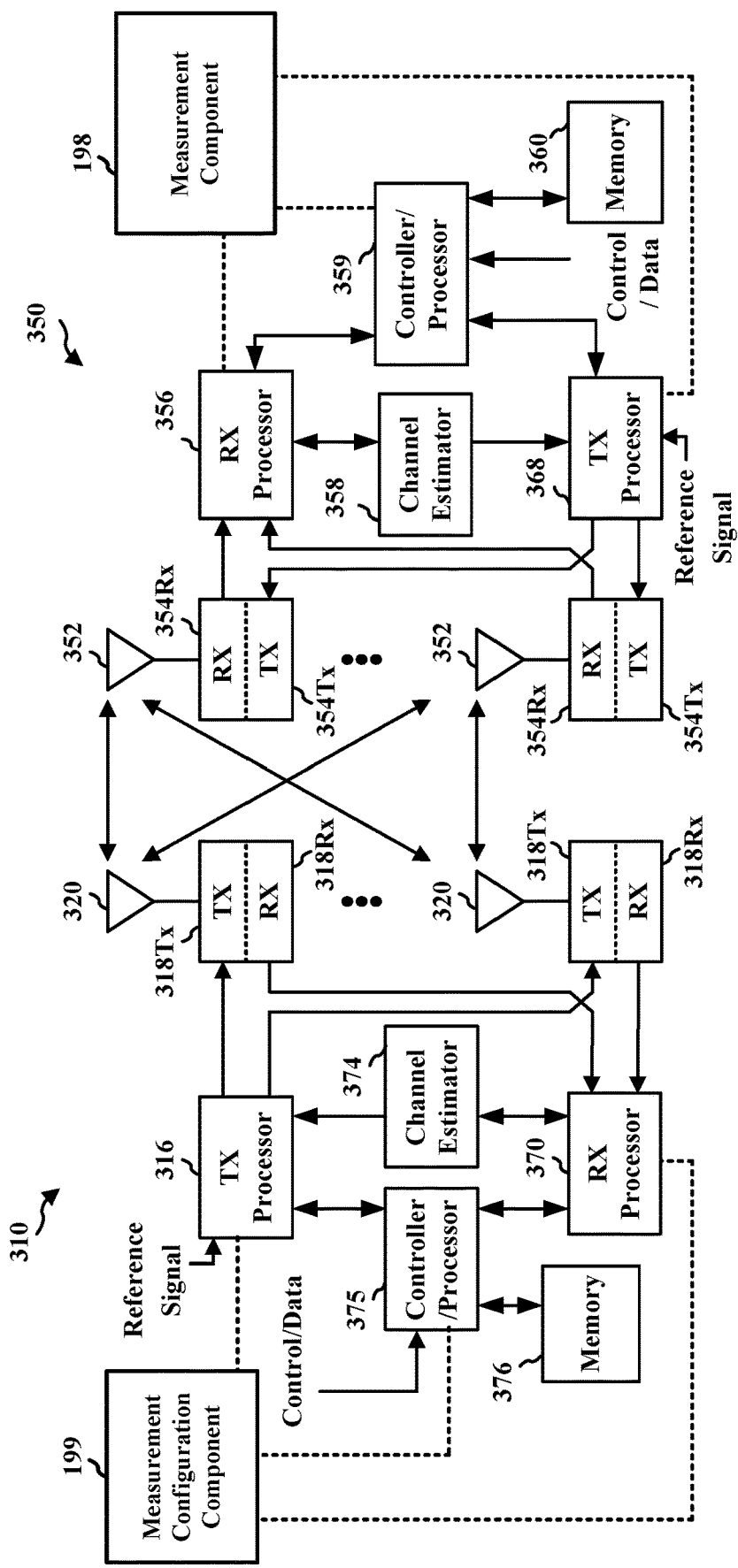
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the measurement component 198 of FIG. 1.

At least one of the TX processor 316, the RX processor 370, and the controller/processor 375 may be configured to perform aspects in connection with the measurement configuration component 199 of FIG. 1.

Figure 4:
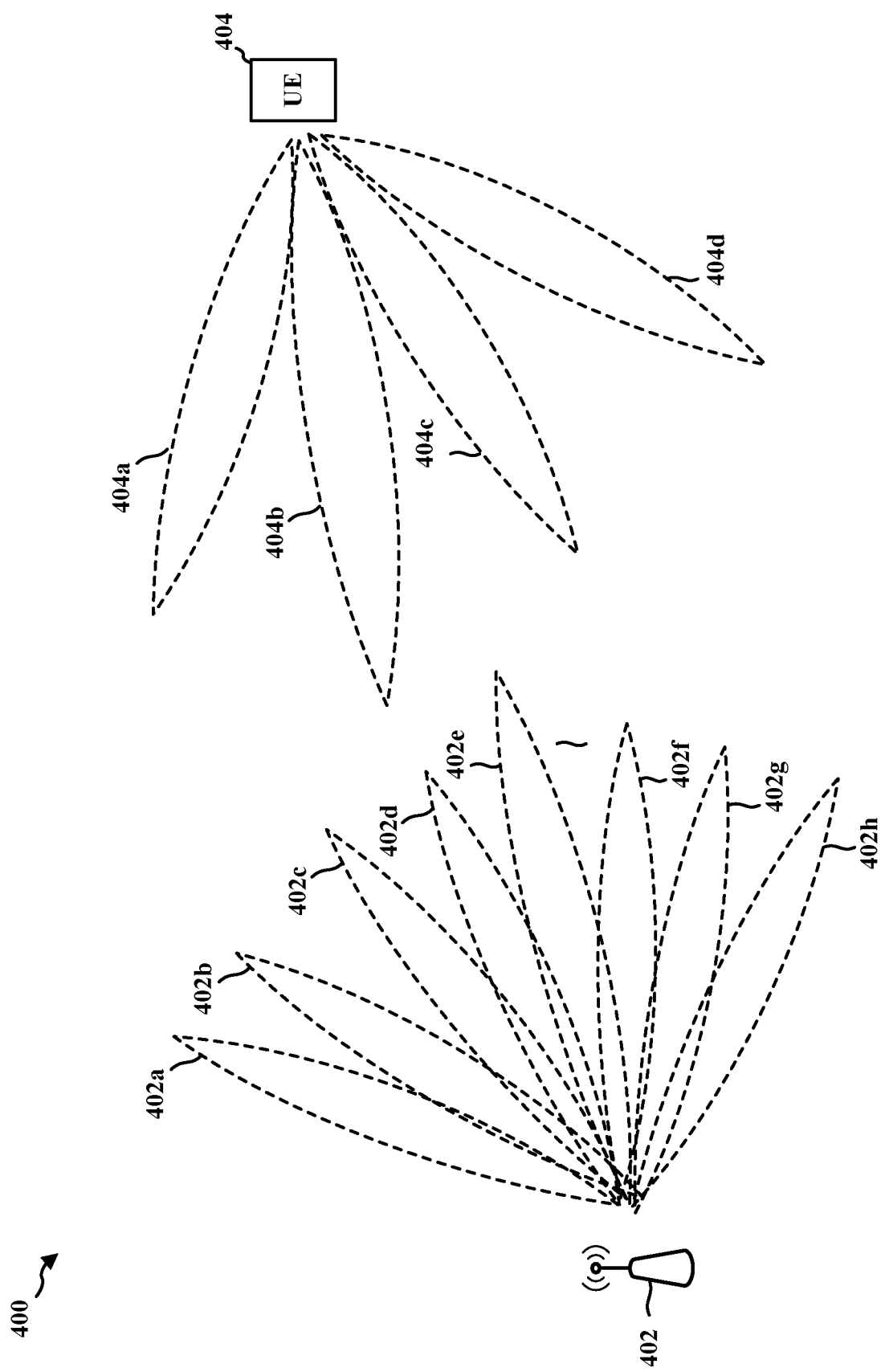
FIG. 4 is a diagram illustrating example aspects of beamformed communication between a UE and a base station, in accordance with various aspects of the present disclosure.

As illustrated in the diagram 400 in FIG. 4, the base station 402 and UE 404 may use beamformed communication to communicate over active data/control beams, e.g., directional beams, both for downlink communication and uplink communication. The base station and/or UE may perform beam management to perform measurements for various beams and to switch to an improved beam as conditions change. In some aspects, the UE and/or base station may switch to using a new beam direction based on beam failure recovery procedures. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, the UE 404 may determine to switch beams, e.g., between beams 402a-402h. The beam at the UE 404 may be used for reception of downlink communication and/or transmission of uplink communication.

The UE may monitor the quality of the beams that it uses for communication with a base station. For example, a UE may monitor a quality of a signal received via reception beam(s). For monitoring active link performances, a UE may perform measurements of at least one signal, e.g., reference signals, for beam failure detection. The measurements may include deriving a metric similar to a Signal to Interference plus Noise Ratio (SINR) for the signal, or RSRP strength or block error rate (BLER) of a reference control channel chosen by base station and/or implicitly derived by UE based on the existing RRC configuration. The reference signal may comprise any of CSI-RS, Physical Broadcast Channel (PBCH), a synchronization signal, or other reference signals for time and/or frequency tracking, etc. In some cases, the UE may determine a configured metric such as block error rate (BLER) for a reference signal. The measurement(s) may indicate the UE's ability to transmit an uplink transmission to the base station using the beam and/or to receive downlink communication from the base station. In some examples, the base station 402 may send a transmission that triggers a beam switch by the UE 404. The transmission may be based on measurements that the UE performs and reports to the base station. Switching beams may provide an improved connection between the UE and the base station by ensuring that the transmitter and receiver use the same configured set of beams for communication. In some aspects, a UE may be in an RRC idle or RRC inactive state and may use the measurements to select a new beam, e.g., without signaling from the base station.

Similarly, a UE may perform measurements of a signal received from the current serving cell for the UE and may perform measurements of neighbor cells. The measurements may be based on a downlink reference signal, such as an SSB, CSI-RS, tracking reference signal (TRS), etc. The measurements may be performed at a cell level and/or at a beam level. For example, a single neighbor cell may transmit the reference signals using different beams, and the UE may measure the reference signal over each of the different beams. For example, the neighbor cell may transmit an SSB over different beams in a beamsweep pattern over time, and the UE may obtain the measurements of the SSB over the different beams. The UE may use the measurements to determine if the UE should continue to communicate with the network via the current serving cell or whether improved coverage for the UE appears to be provided by a neighbor cell. The UE may report information based on the measurements, which may trigger mobility of the UE to the neighbor cell providing improved coverage for the UE. As an example, the first cell may perform a handover of the UE to the neighbor cell. In some aspects, the UE may perform cell selection or reselection based on the measurements of the current serving cell and one or more neighbor cells.

In order to perform the measurements to compare a serving cell to a neighbor cell and/or to compare a serving beam to a non-serving beam, the UE may repeatedly perform cell measurements and/or beam measurements, which consumes power at the UE. A UE may rely on battery power, power saving techniques for the cell measurements and/or beam measurements may be helpful to the UE in conserving power, including UEs communicating based on a mmW. The reduction may enable smaller form-factor devices, which may include lower-power wake-up signal (WUS) monitoring device or wake-up radio (WUR). As a non-limiting example, the power reduction may be used for an internet of things (IoT) device, such as an industrial sensor or controller, or a wearable. L1 procedures a higher layer protocols may support such WUS/WUR. As well, it may be helpful for such power saving mechanisms to avoid increases in latency, network power consumption, capacity, and/or resource overhead while allowing for coexistence with non-low power WUR UEs and maintain network coverage.

In some aspects, radio resource management (RRM) relaxation may be provided, and a UE may reduce the frequency or amount of measurements for neighbor cells in certain scenarios. As an example, a stationary UE or a UE that is not near a cell edge may reduce one or more measurements for RRM.

Figure 5:
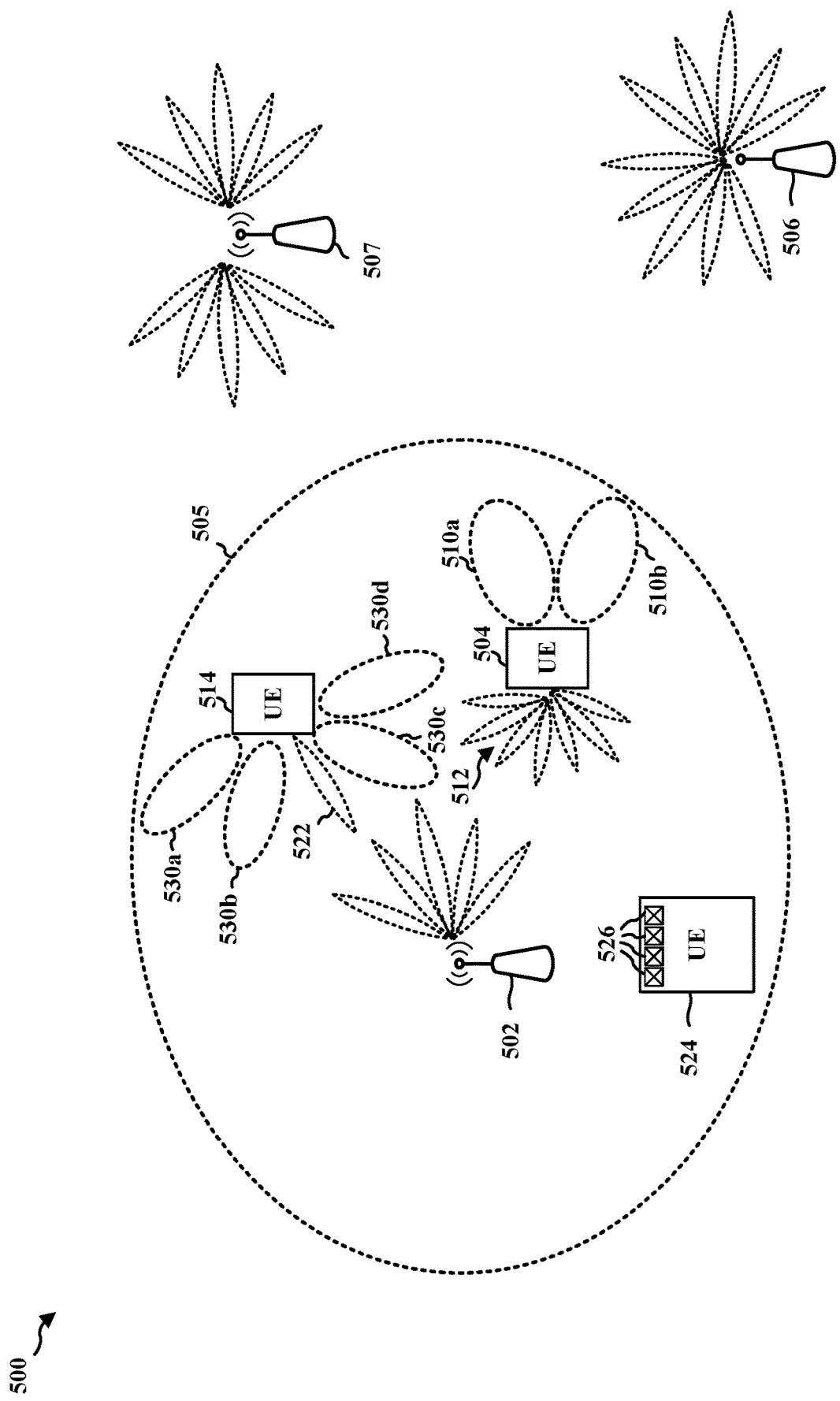
FIG. 5 is a diagram illustrating example aspects of measurement of a serving cell/beam using a different receiver or measurement parameters than for a measurement of a neighbor cell or non-serving beam, in accordance with various aspects of the present disclosure.

Aspects presented herein provide for a UE to use a different radio (e.g., a first, higher power radio or a lower power radio) to measure a serving cell than to measure neighbor cells. Aspects presented herein provide for a UE to use a different radio (e.g., a first, higher power radio or a lower power radio) to measure a serving beam than to measure a non-serving beam. For example, the UE may use a different receiver beam level with a different beam management gain to measure a serving cell beam and a neighbor cell beam. As one example, the UE may use a narrow reception beam to perform the serving cell beam measurement with a high beam refined gain, and which also may have higher power consumption. The UE may then use a wider reception beam for neighbor cell beam measurements with a lower beam refined gain, and which has a lower power consumption. FIG. 5 illustrates an example diagram 500 showing a UE 504 that is within the coverage 505 of base station 502 that provides a serving cell to the UE 504. The UE 504 may use one or more narrower beams 512 to perform cell measurements of the serving cell, and may use wider beams, e.g., 510a and 510b to perform measurements of neighbor cells, e.g., such as cells provided by the base stations 506 or 507. FIG. 5 also illustrate a second UE 514 that uses a narrower beam 522 to perform a measurement of a serving beam and uses wider beams 530a, 530b, 530c, and 530d to measure non-serving beams. A different beam width is merely one example of a different measurement parameter than may be used to perform cell measurements or beam measurements.

The different measurement configuration may include at least one of a different reception beam width parameter, a different interference cancellation parameter, a different gain, a different amount of receive antennas, or a different number of iterations. As an example, the UE may use a wider beam for measuring neighbor cells according to the different measurement configuration and may use a narrower beam for serving cell or serving beam. The UE may perform a higher level of interference cancellation for measurements for a serving cell or serving beam and a lower level of interference cancellation for measurements of a neighbor cell or a non-serving beam. The measurements may have a higher gain for measurements of the serving cell or serving beam and measurements of the neighbor cells or non-serving beams may have a lower gain. The UE may use a larger number of receive antennas for measurements of the serving cell or serving beam and may use a smaller number of receive antennas for measurements of the neighbor cells or non-serving beam. As an example, the UE 524 may have four antennas 526. The UE 524 may use the four antennas 526 for measurements of the serving cell and/or of the serving beam. The UE may use a subset of the four antennas, e.g., 1 antenna, 2 antennas, or 3 antennas, to perform measurements of a neighbor cell and/or non-serving beam. The UE may use a larger number of iterations when receiving a signal to perform measurements of a serving cell or a serving beam and may use a smaller number of iterations when performing measurements of the neighbor cells or non-serving beams.

Figure 6A:
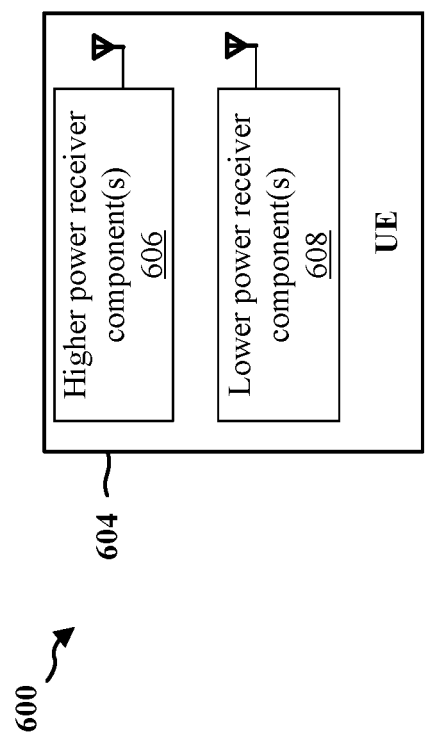
FIG. 6A illustrates a UE having different receivers, in accordance with various aspects of the present disclosure.

As illustrated in the diagram 600 in FIG. 6A, in some aspects, the UE 604 may include separate receivers, e.g., different components, that the UE uses for the different measurements. For example, the UE 604 may use the higher power receiver component(s) for serving cell measurements and/or serving beam measurements. The UE 604 may use a different receiver, e.g., the lower power receiver component(s) 608 to perform measurements of the neighbor cells and/or non-serving beams.

Figure 6B:
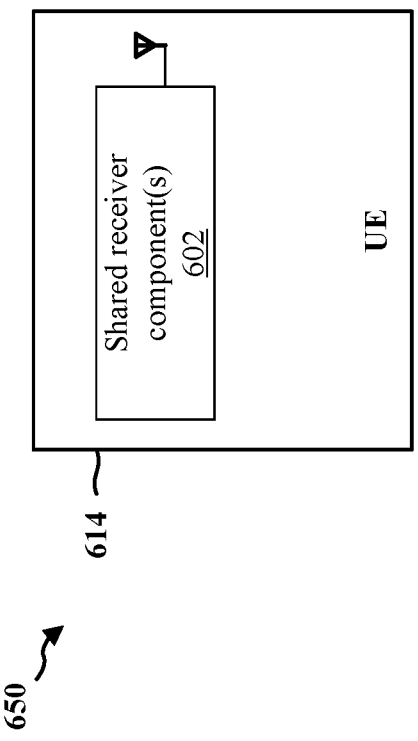
FIG. 6B illustrates a UE having a shared receiver for the different measurements, in accordance with various aspects of the present disclosure.

In other aspects, as shown in the diagram 650 in FIG. 6B, the UE 614 may have shared receiver component(s) 602 that are used for both the serving cell and the neighbor cells measurements and/or for the serving beam and non-serving beam measurements. However, different measurement configurations, e.g., different parameters, may be used by the shared receiver component 602 to perform the different measurements.

In some aspects, the higher power receiver components 606 or the configuration for the serving cell/serving beam measurements performed by the shared receiver component 602 may be more accurate, provide a higher level of gain, be more complex, and/or consume more power at the UE. The lower power receiver components 608 or the configuration for the neighbor cell/non-serving beam measurements performed by the shared receiver component 602 may be less accurate, provide a lower level of gain, be less complex, and/or consume less power at the UE.

Aspects presented herein provide for coordination between the UE and the network about the use of a different receiver and/or different measurement parameters in order to allow for the power saving benefits at the UE while maintaining mobility performance, handover without added delay, and avoiding dropped calls. In some aspects, a neighbor cell beam reference signal received power (RSRP) may be approximately 9 dB less than an RSRP for a serving cell dur to a different beam width or beam refinement gain. The coordination between the UE and the network enables the network and/or the UE to adjust based on the anticipated difference.

Figure 7:
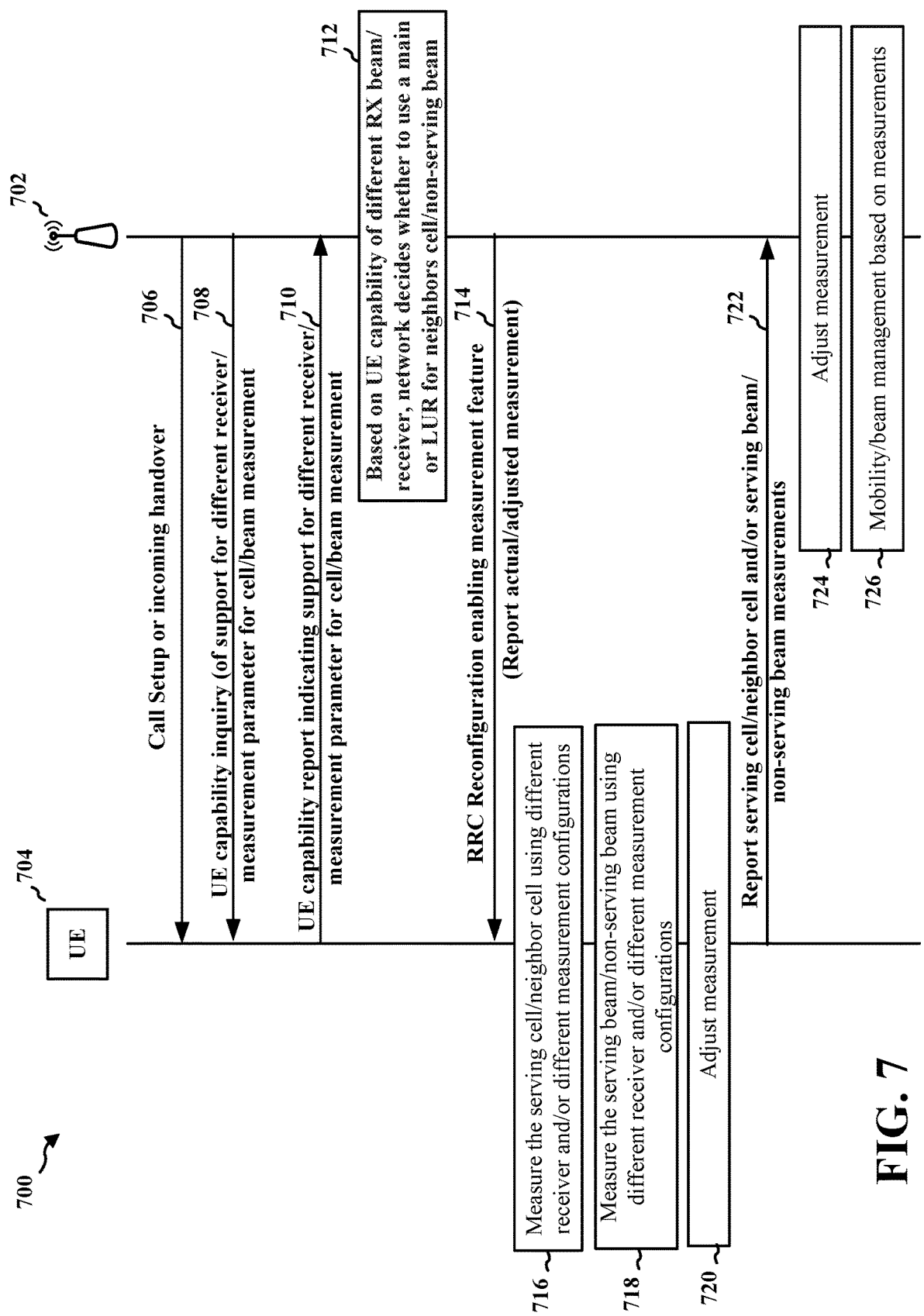
FIG. 7 is a communication flow between a UE and a base station, in accordance with the various aspects of the present disclosure.

FIG. 7 illustrates an example communication flow 700 between a UE 704 and a base station 702 including a UE capability to use a different receiver or the same receiver with a different reception beam, interference cancelation, gain, number of antennas, number of iterations, or other measurement parameters for serving and neighbor cell measurements and/or beam management. Although the aspects are described for a base station 702, the aspects may be performed by the base station in aggregation or may be performed by one or more components of the base station, such as a CU 110, DU 130, and/or RU 140.

As described in connection with FIG. 6A, the UE 704 may include a main radio, e.g., receiver, for measurements of the serving cell and/or serving beam. The UE may include a low power consumption radio for neighbor cell measurements. As described in connection with FIG. 6B, the UE may use shared components, yet may support the use of different measurement configurations for the serving cell/beam and neighbor cell/non-serving beam. FIG. 7 illustrates that there may be a call setup or incoming handover 706 for the UE 704. The base station 702 may transmit a UE capability inquiry 708 requesting for the UE 704 to inform the base station whether the UE supports the use of a different receiver or different measurement configuration for different cell/beam measurements. The different measurement configuration may include at least one of a different reception beam width parameter, a different interference cancellation parameter, a different gain, a different amount of receive antennas, or a different number of iterations. As an example, the base station 702 may transmit the UE capability inquiry 708 asking the UE to inform the base station whether the UE supports the use of the different receiver or different measurement configuration for serving cell measurements and neighbor cell measurements. As another example, the base station 702 may transmit the UE capability inquiry 708 asking the UE to inform the base station whether the UE supports the use of the different receiver or different measurement configuration for serving beam measurements and non-serving beam measurements.

The UE 704 may respond by transmitting a UE capability report 710, or message with UE capability information, indicating that the UE does support a measurement feature (which may be referred to herein as a measurement capability) that includes the use of a different receiver or different measurement configuration for cell/beam measurements. The UE may indicate the support for the measurement feature for a particular type of measurement, e.g., an intra-frequency neighbor cell measurements, an inter-frequency neighbor cell measurements, an inter-radio access technology (inter-RAT) neighbor cell measurements, and/or an intra-radio access technology (intra-RAT) neighbor cell measurements.

Figure 8:
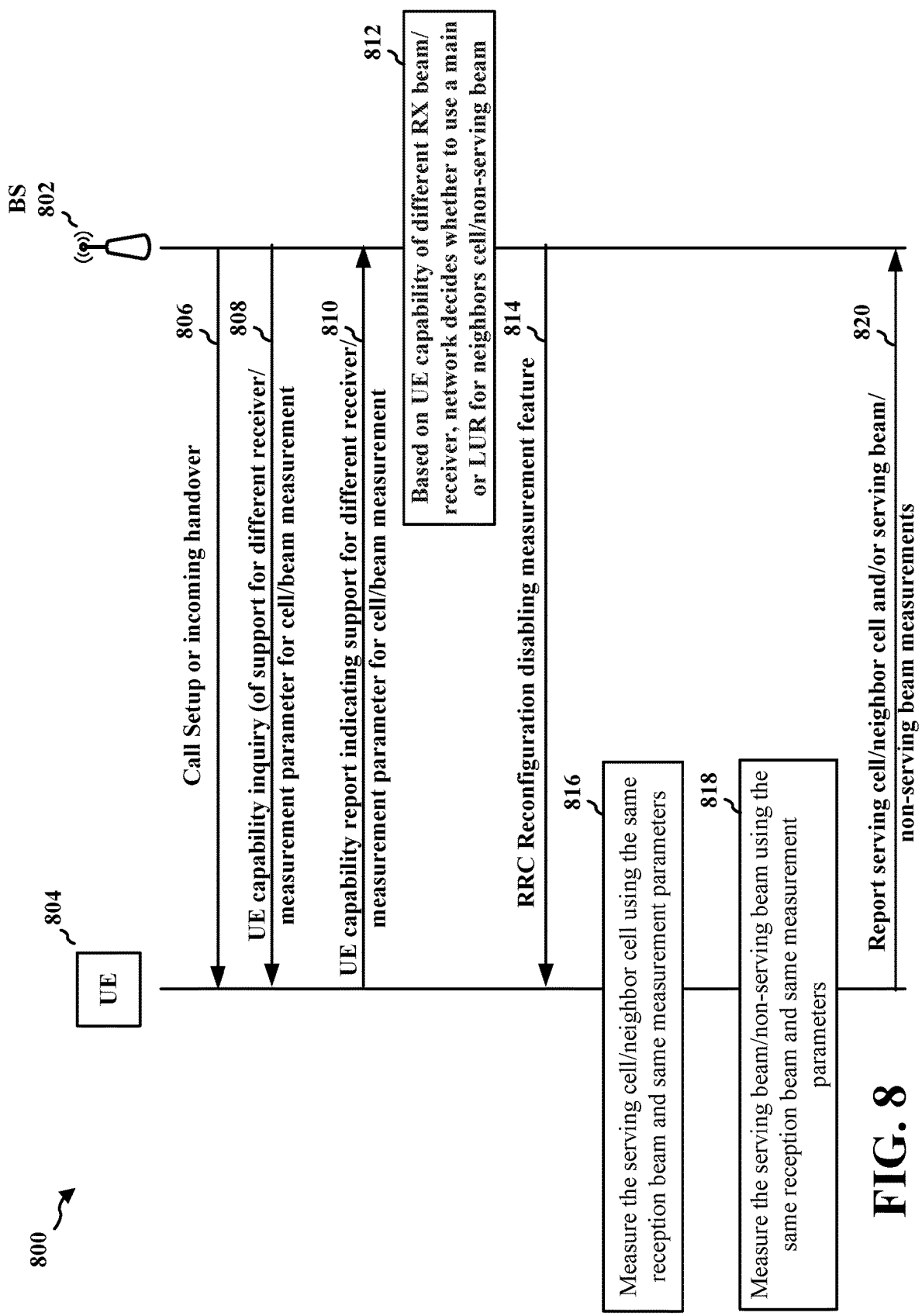
FIG. 8 is a communication flow between a UE and a base station, in accordance with the various aspects of the present disclosure.

As illustrated at 712, the base station may then determine, based on the UE capability, whether the UE is to use a main receiver/shared configuration or a low power receiver (LUR)/lower power configuration to measure neighbor cells and/or non-serving beams. Based on the determination, the base station 702 transmits an RRC configuration 714 to the UE 704 either enabling or disabling the measurement feature in which the UE measures cells/beams using a different receiver or different measurement configuration. For example, in FIG. 7, the base station 702 may enable the measurement feature, at 714. In contrast, FIG. 8 illustrates an example in which a base station may disable the measurement feature. In addition to the indication that the measurement feature is enabled, the base station 702 may also indicate to the UE whether the UE is to report the actual measurements (e.g., with gain information) or is to adjust the measurement of the non-serving beam/neighbor cell before reporting the measurements to the base station. The configuration may enable the measurement feature for a particular type of measurements, such as intra-frequency neighbor cell measurements, inter-frequency neighbor cell measurements, inter-RAT neighbor cell measurements, and/or intra-RAT neighbor cell measurements.

Then, at 716, the UE may measure a serving cell using a first receiver or a first measurement configuration and measures a neighbor cell using a second receiver or a second measurement configuration, e.g., as described in connection with any of FIGS. 5-6B. Additionally, or alternatively, at 718, the UE may measure a serving beam using a first receiver or a first measurement configuration and measures a non-serving beam using a second receiver or a second measurement configuration, e.g., as described in connection with any of FIGS. 5-6B. The different measurement configuration may include at least one of a different reception beam width parameter, a different interference cancellation parameter, a different gain, a different amount of receive antennas, or a different number of iterations. As an example, the UE may use a wider beam for measuring neighbor cells according to the different measurement configuration and may use a narrower beam for serving cell or serving beam. The UE may perform a higher level of interference cancellation for measurements for a serving cell or serving beam and a lower level of interference cancellation for measurements of a neighbor cell or a non-serving beam. The measurements may have a higher gain for measurements of the serving cell or serving beam and measurements of the neighbor cells or non-serving beams may have a lower gain. The UE may use a larger number of receive antennas for measurements of the serving cell or serving beam and may use a smaller number of receive antennas for measurements of the neighbor cells or non-serving beam. The UE may use a larger number of iterations when receiving a signal to perform measurements of a serving cell or a serving beam and may use a smaller number of iterations when performing measurements of the neighbor cells or non-serving beams.

Then, at 722, the UE 704 reports the measurements to the base station 702. If the configuration, at 714, indicated for the UE to report the actual measurements, the UE may transmit the non-serving beam measurements and/or neighbor cell measurements without adjustment. In some aspects, the UE may include information about the expected gain difference. As an example, the UE can provide the expected beam refined gain in a measurement report, e.g., in addition to a measurement report. As an example, the UE may provide to the base station 702, a report neighbor of the cell RSRP+an expected beam refined gain (approximately 10 dB) in a Measurement Report, e.g., 722. If the configuration, at 714, indicated for the UE to report an adjusted measurement, the UE may adjust the measurement at 720 to normalize the measurements by adjusting for the gain difference. In some aspects, the UE may adjust the low power measurement. In other aspects, the UE may adjust the higher power measurement. After adjusting the measurement using the different receiver or different measurement configuration, the UE may report the serving cell/serving beam measurement and the adjusted neighbor cell/non-serving cell measurement.

The report at 722 may be at the cell level and/or the beam level.

If the UE did not adjust the measurement, at 720, the base station may adjust the received measurement, at 724 to account for the gain difference. For example, the base station may use the expected gain information received from the UE 704 to adjust the measurement of the neighbor cell or non-serving beam. As illustrated at 726, the base station may use the measurements for a mobility determination, and/or beam management determination. As an example, the base station may initiate a handover of the UE to a neighbor cell if the measurements indicate that the neighbor cell will provide better coverage to the UE. The base station may communicate with the using a new beam based on the reported measurements, e.g., a beam switch.

FIG. 8 illustrates an example communication flow 800 between a UE 804 and a base station 802 including a UE capability to use a different receiver or the same receiver with a different reception beam, interference cancelation, gain, number of antennas, number of iterations, or other measurement parameters for serving and neighbor cell measurements and/or beam management. Although the aspects are described for a base station 802, the aspects may be performed by the base station in aggregation or may be performed by one or more components of the base station, such as a CU 110, DU 130, and/or RU 140.

As described in connection with FIG. 6A, the UE 804 may include a main radio, e.g., receiver, for measurements of the serving cell and/or serving beam. The UE may include a low power consumption radio for neighbor cell measurements. As described in connection with FIG. 6B, the UE may use shared components, yet may support the use of different measurement configurations for the serving cell/beam and neighbor cell/non-serving beam. FIG. 8 illustrates that there may be a call setup or incoming handover 806 for the UE 804. The base station 802 may transmit a UE capability inquiry 808 requesting for the UE 804 to inform the base station whether the UE supports the use of a different receiver or different measurement configuration for different cell/beam measurements, as described in connection with FIG. 7.

The UE 804 may respond by transmitting a UE capability report 810, or message with UE capability information, indicating that the UE does support a measurement feature that includes the use of a different receiver or different measurement configuration for cell/beam measurements, e.g., as described in connection with FIG. 7.

As illustrated at 812, the base station may then determine, based on the UE capability, whether the UE is to use a main receiver/shared configuration or a low power receiver/lower power configuration to measure neighbor cells and/or non-serving beams. Based on the determination, the base station 802 transmits an RRC configuration 814 to the UE 804 either enabling or disabling the measurement feature in which the UE measures cells/beams using a different receiver or different measurement configuration. 8 In contrast to FIG. 7, FIG. 8 illustrates an example in which a base station may disable the measurement feature.

Then, at 816, the UE may measure a serving cell and a neighbor cell using a same receiver and a same measurement configuration. Additionally, or alternatively, at 818, the UE may measure a serving beam using the same receiver and the same measurement configuration as for a non-serving beam.

Then, at 820, the UE 804 reports the measurements to the base station 802. The report at 820 may be at the cell level and/or the beam level. Similar to 726, the base station may use the measurements for a mobility determination, and/or beam management determination.

Figure 9:
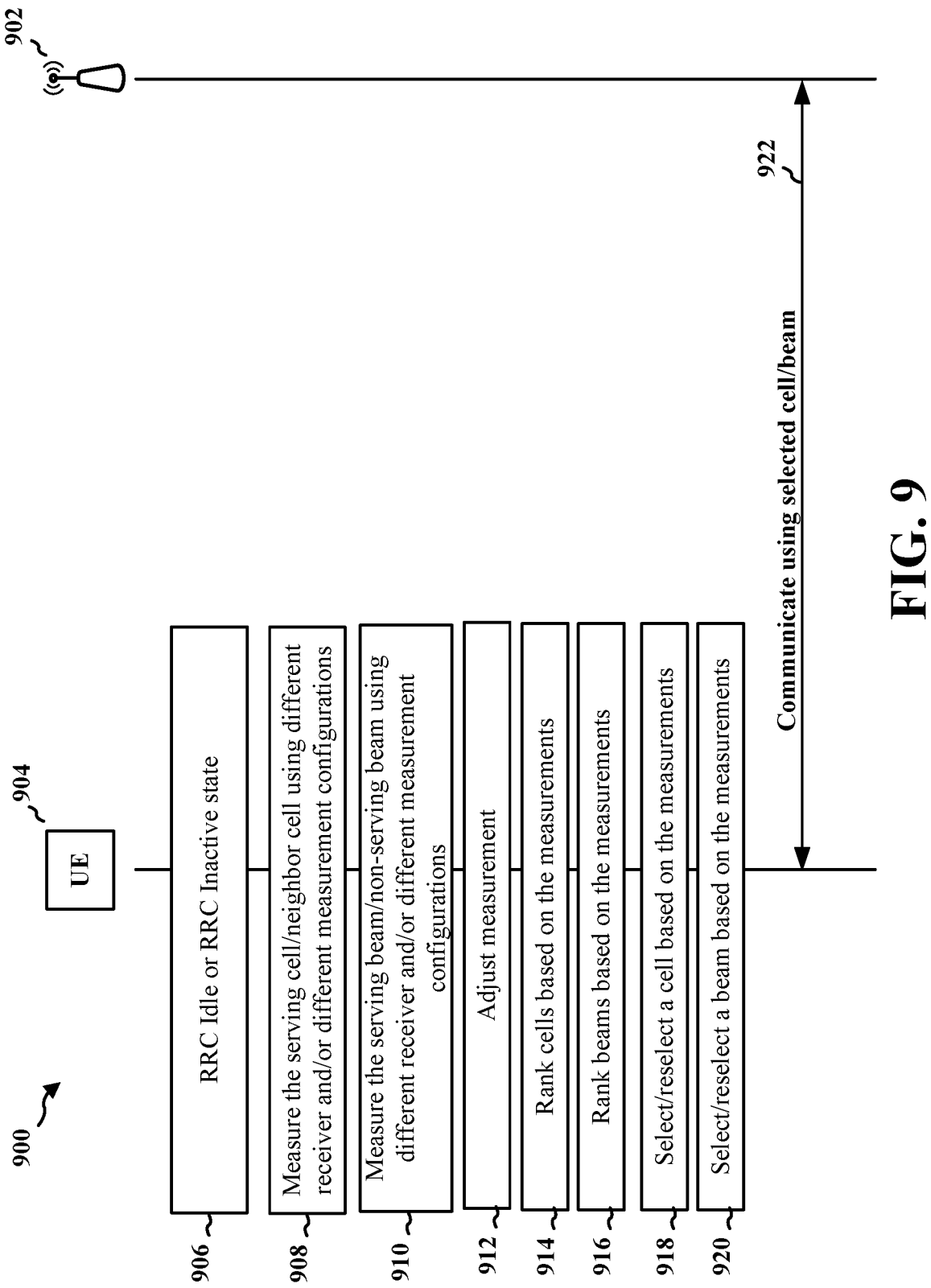
FIG. 9 is a communication flow between a UE and a base station, in accordance with the various aspects of the present disclosure.

FIG. 9 illustrates an example communication flow 900 between a UE 904 and a base station 902 including a UE capability to use a different receiver or the same receiver with a different reception beam, interference cancelation, gain, number of antennas, number of iterations, or other measurement parameters for serving and neighbor cell measurements and/or beam management. Although the aspects are described for a base station 902, the aspects may be performed by the base station in aggregation or may be performed by one or more components of the base station, such as a CU 110, DU 130, and/or RU 140. In contrast to FIG. 7 and FIG. 8, in FIG. 9, the UE is in an RRC idle state or an RRC inactive state, as shown at 906.

Then, at 908, the UE may measure a serving cell using a first receiver or a first measurement configuration and measures a neighbor cell using a second receiver or a second measurement configuration, e.g., as described in connection with any of FIGS. 5-6B. Additionally, or alternatively, at 910, the UE may measure a serving beam using a first receiver or a first measurement configuration and measures a non-serving beam using a second receiver or a second measurement configuration, e.g., as described in connection with any of FIGS. 5-6B. The different measurement configuration may include at least one of a different reception beam width parameter, a different interference cancellation parameter, a different gain, a different amount of receive antennas, or a different number of iterations. As an example, the UE may use a wider beam for measuring neighbor cells according to the different measurement configuration and may use a narrower beam for serving cell or serving beam. The UE may perform a higher level of interference cancellation for measurements for a serving cell or serving beam and a lower level of interference cancellation for measurements of a neighbor cell or a non-serving beam. The measurements may have a higher gain for measurements of the serving cell or serving beam and measurements of the neighbor cells or non-serving beams may have a lower gain. The UE may use a larger number of receive antennas for measurements of the serving cell or serving beam and may use a smaller number of receive antennas for measurements of the neighbor cells or non-serving beam. The UE may use a larger number of iterations when receiving a signal to perform measurements of a serving cell or a serving beam and may use a smaller number of iterations when performing measurements of the neighbor cells or non-serving beams.

As illustrated at 912, the UE may adjust the non-serving beam or neighbor cell measurement to adjust for the expected gain. Then, at 914, in some aspects, the UE may rank cells, e.g., including the serving cell and at least one non-serving cell, based on the measurements at 908 and/or 910. As illustrated at 916, the UE may rank beams, based on the measurements at 908 and/or 910. At 918, the UE 904 may select a cell based on the measurements from 908 and/or 910. At 920, the UE may select a new beam based on the measurements at 908 and/or 910. As illustrated at 922, the UE 904 may communicate with the base station 902 using a cell or beam selected based on the measurements at 908 and/or 910.

Figure 10:
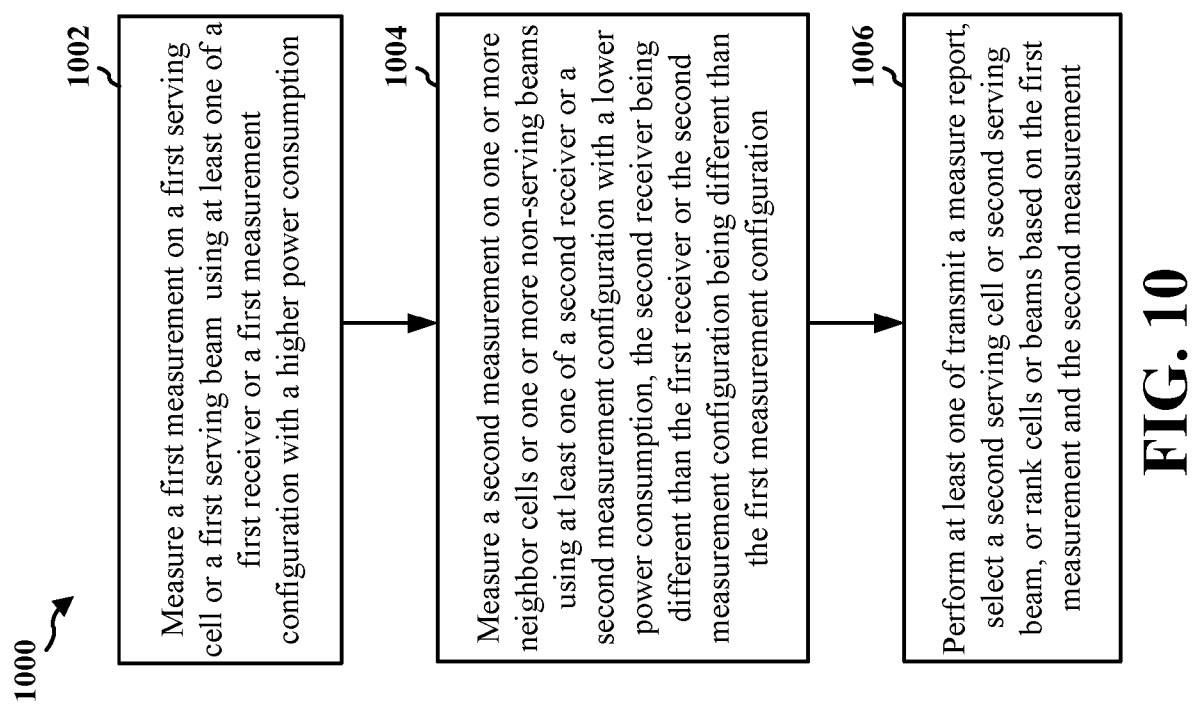
FIG. 10 is a flowchart of a method of wireless communication at a UE, in accordance with various aspects of the present disclosure.

FIG. 10 is a flowchart 1000 of a method of wireless communication. The method may be performed by a UE (e.g., the UE 104, 350, 704, 804, 904; the apparatus 1204). The method may enable the UE to reduce power for at least a portion of measurements by enabling the UE to perform more accurate measurements that consume more power for a serving cell or a serving beam, and less accurate measurements that consume less power for neighbor cells or non-serving beams. Aspects presented herein enable a coordination between the UE and the network to adjust for refinement gain in order to maintain mobility performance, timely handover, and avoid dropped calls while still allowing for power reduction at the UE.

At 1002, the UE measures a first measurement on a first serving cell or a first serving beam using at least one of a first receiver or a first measurement configuration with a higher gain and a higher power consumption than a second receiver or a second measurement configuration. The measurement may be performed, e.g., by the measurement component 198, which may be a component of the apparatus 1204, or the UE 104 or 350. FIGS. 7 and 9 illustrate examples of a UE performing a measurement of a serving cell or a serving beam using a higher power/more accurate measurement configuration.

At 1004, the UE measures a second measurement on one or more neighbor cells or one or more non-serving beams using at least one of the second receiver or the second measurement configuration with a lower gain and a lower power consumption than the first receiver or the first measurement configuration, the second receiver being different than the first receiver or the second measurement configuration being different than the first measurement configuration. The measurement may be performed, e.g., by the measurement component 198, which may be a component of the apparatus 1204, or the UE 104 or 350. FIGS. 7 and 9 illustrate examples of a UE performing a measurement of a neighbor cell or a non-serving beam using a lower power/less accurate measurement configuration.

At 1006, the UE performs at least one of: transmitting a measurement report to a network node based on the first measurement and the second measurement, selecting a second serving cell or a second serving beam based on the first measurement and the second measurement based on a rank, or ranking cells or beams based on the first measurement and the second measurement. As an example, the UE may be in an RRC connected mode and may transmit a measurement report to the network node based on the measurements. In some aspects, the UE may be in an RRC idle or an RRC inactive mode and may use the measurements to select or reselect a serving cell or a serving beam and/or to rank cells or beams. FIGS. 7 and 8 illustrate an example of a UE reporting the measurements or using the measurements for cell/beam selection or ranking.

Figure 11:
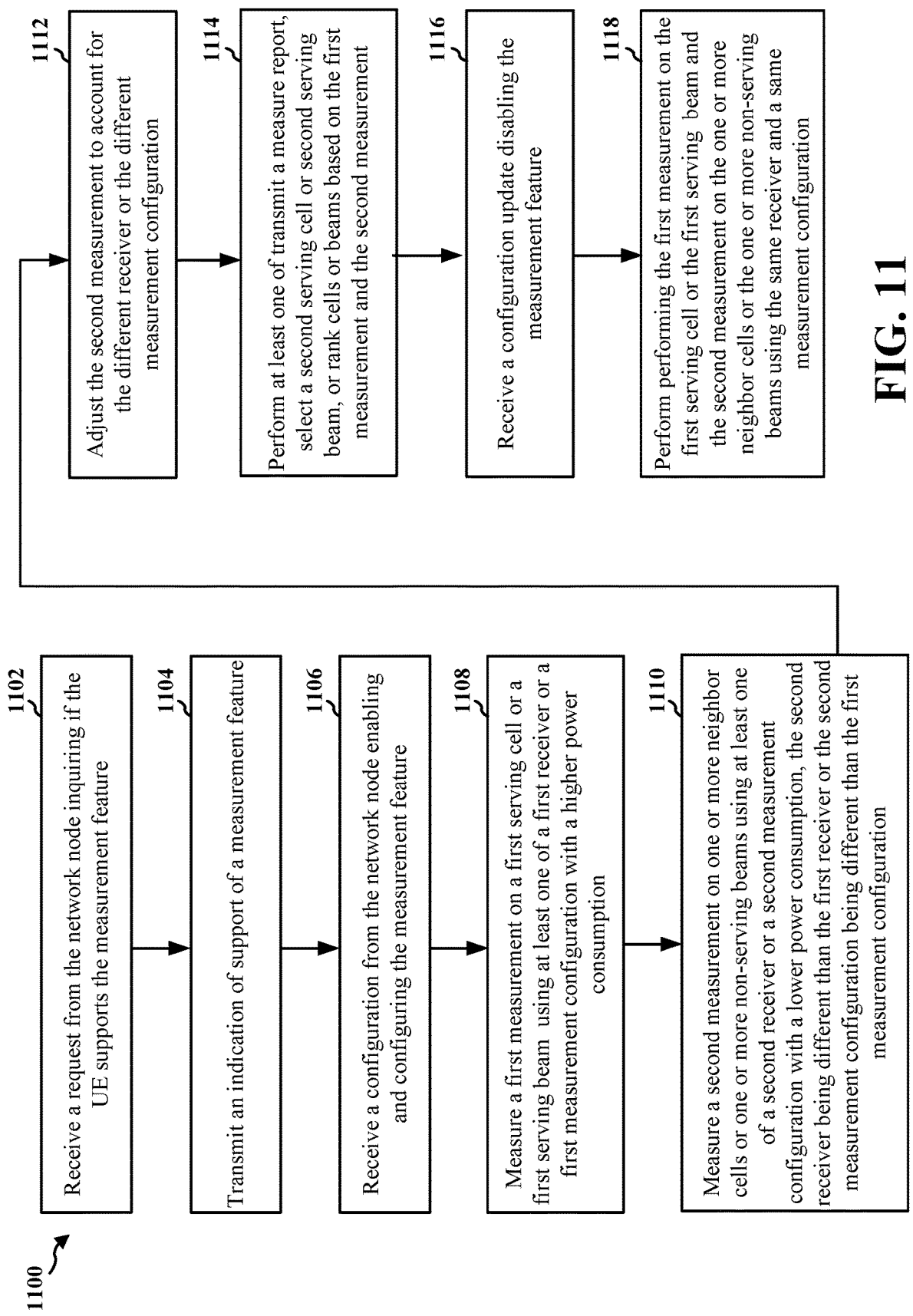
FIG. 11 is a flowchart of a method of wireless communication at a UE, in accordance with various aspects of the present disclosure.

FIG. 11 is a flowchart 1100 of a method of wireless communication. The method may be performed by a UE (e.g., the UE 104, 350, 704, 804, 904; the apparatus 1204). The method may enable the UE to reduce power for at least a portion of measurements by enabling the UE to perform more accurate measurements that consume more power for a serving cell or a serving beam, and less accurate measurements that consume less power for neighbor cells or non-serving beams. Aspects presented herein enable a coordination between the UE and the network to adjust for refinement gain in order to maintain mobility performance, timely handover, and avoid dropped calls while still allowing for power reduction at the UE.

At 1108, the UE measures a first measurement on a first serving cell or a first serving beam using at least one of a first receiver or a first measurement configuration with a higher gain and a higher power consumption than a second receiver or a second measurement configuration. The measurement may be performed, e.g., by the measurement component 198, which may be a component of the apparatus 1204, or the UE 104 or 350. FIGS. 5, 7, and 8 illustrate examples of a UE performing a measurement of a serving cell or a serving beam using a higher power/more accurate measurement configuration.

At 1110, the UE measures a second measurement on one or more neighbor cells or one or more non-serving beams using at least one of the second receiver or the second measurement configuration with a lower gain and a lower power consumption than the first receiver or the first measurement configuration, the second receiver being different than the first receiver or the second measurement configuration being different than the first measurement configuration. The measurement may be performed, e.g., by the measurement component 198, which may be a component of the apparatus 1204, or the UE 104 or 350. FIGS. 7 and 8 illustrate examples of a UE performing a measurement of a neighbor cell or a non-serving beam using a lower power/less accurate measurement configuration. In some aspects, the first receiver or the first measurement configuration provides a higher level of accuracy and consumes a higher amount of power than the second receiver or the second measurement configuration.

At 1114, the UE performs at least one of: transmitting a measurement report to a network node based on the first measurement and the second measurement, selecting a second serving cell or a second serving beam based on the first measurement and the second measurement based on a rank, or ranking cells or beams based on the first measurement and the second measurement. FIG. 7 illustrates an example of a UE reporting the measurements or using the measurements for cell/beam selection or ranking. In some aspects, the UE may be in an RRC inactive mode or an RRC idle mode, and the UE may select, at 1114, the second serving cell or the second serving beam based on the first measurement and the second measurement based on the first measurement and the second measurement. In some aspects, the UE may be in an RRC inactive mode or an RRC idle mode, and the UE may rank, at 1114, ranks the cells based on the first measurement and the second measurement. In some aspects, the UE may be in an RRC connected may, and may transmit, at 1114, a measurement report to the network node based on the first measurement and the second measurement.

In some aspects, at 1104, the UE may transmit, to the network node, an indication of support of a measurement capability (which may also be referred to as a measurement feature) including use of a different receiver or same receiver with a different measurement configuration for the first measurement on the first serving cell or the first serving beam and the second measurement on the one or more neighbor cells or the one or more non-serving beams. The transmission may be performed, e.g., by the measurement component 198, transceiver 1222, and/or antenna 1280, e.g., of the apparatus 1204, the UE 104 or 350. FIGS. 7 and 8 illustrate an example of a UE indicating support for a UE capability for such different measurement configurations to a base station. The different measurement configuration may include at least one of a different reception beam width parameter, a different interference cancellation parameter, a different gain, a different amount of receive antennas, or a different number of iterations. As an example, the UE may use a wider beam for measuring neighbor cells according to the different measurement configuration and may use a narrower beam for serving cell or serving beam. The UE may perform a higher level of interference cancellation for measurements for a serving cell or serving beam and a lower level of interference cancellation for measurements of a neighbor cell or a non-serving beam. The measurements may have a higher gain for measurements of the serving cell or serving beam and measurements of the neighbor cells or non-serving beams may have a lower gain. The UE may use a larger number of receive antennas for measurements of the serving cell or serving beam and may use a smaller number of receive antennas for measurements of the neighbor cells or non-serving beam. The UE may use a larger number of iterations when receiving a signal to perform measurements of a serving cell or a serving beam and may use a smaller number of iterations when performing measurements of the neighbor cells or non-serving beams. The indication may indicate the support for the measurement capability for one or more of intra-frequency neighbor cell measurements, inter-frequency neighbor cell measurements, inter-RAT neighbor cell measurements, or intra-RAT neighbor cell measurements.

At 1106, the UE receives a configuration from the network node enabling and configuring the measurement capability, wherein the first measurement and the second measurement are based on the configuration. The reception may be performed, e.g., by the measurement component 198, transceiver 1222, and/or antenna 1280, e.g., of the apparatus 1204, the UE 104 or 350. FIGS. 7 and 8 illustrate examples of a UE receiving a configuration from a base station for the measurement capability. The configuration from the network node may enable or disable the measurement capability for one or more of intra-frequency neighbor cell measurements, inter-frequency neighbor cell measurements, inter-RAT neighbor cell measurements, or intra-RAT neighbor cell measurements.

In some aspects, at 1102, the UE may receive a request from the network node inquiring if the UE supports the measurement capability including the use of the different receiver or the same receiver and the different measurement configuration for the first measurement on the first serving cell and the second measurement on the one or more neighbor cells or the one or more non-serving beams. The UE may transmit the indication of the support in response to the request. The reception may be performed, e.g., by the measurement component 198, transceiver 1222, and/or antenna 1280, e.g., of the apparatus 1204, the UE 104 or 350. The request may be in a UE capability inquiry message, and the indication that the UE transmits may be included in a UE capability message, and the configuration is comprised in RRC signaling. FIGS. 7 and 8 illustrate examples of a UE receiving a UE capability inquiry and providing an indication of support for the measurement capability in response to the inquiry.

In some aspects, at 1114, the UE may transmit, to the network node, the measurement report including the first measurement and the second measurement and indicating an expected gain for the one or more neighbor cells, the expected gain based on the different receiver or the different measurement configuration used for the second measurement of the one or more neighbor cells. In some aspects, the configuration that the UE may receive at 1106 indicates for the UE to report the expected gain with the second measurement, if using a first receiver or a gain difference between the first receiver and a second receiver with the second measurement. The transmission may be performed, e.g., by the measurement component 198, transceiver 1222, and/or antenna 1280, e.g., of the apparatus 1204, the UE 104 or 350. FIG. 7 illustrates example aspects of a UE providing a measurement report to a base station.

In some aspects, at 1112, the UE may adjust the second measurement (or non-adjusted second measurement) with the gain difference to account for the different receiver or the different measurement configuration. Then, at 1114, the UE may transmit, to the network node, the measurement report including the first measurement and an adjusted second measurement. The adjustment and the transmission may be performed, e.g., by the measurement component 198, transceiver 1222, and/or antenna 1280, e.g., of the apparatus 1204, the UE 104 or 350. The configuration received at 1106 may indicate for the UE to adjust the second measurement for the one or more neighbor cells or the one or more non-serving beams.

In some aspects, the UE may receive, at 1116, a configuration update disabling the measurement capability. Then, at 1118, the UE may perform the first measurement on the first serving cell or the first serving beam and the second measurement on the one or more neighbor cells or the one or more non-serving beams using the same receiver and a same measurement configuration. The reception of the configuration and the measurement may be performed, e.g., by the measurement component 198, transceiver 1222, and/or antenna 1280, e.g., of the apparatus 1204, the UE 104 or 350. FIG. 8 illustrates example aspects of a UE receiving an indication from a base station to use a same measurement configuration for measurements of both a serving and neighbor cells or for a serving beam and non-serving beams.

Figure 12:
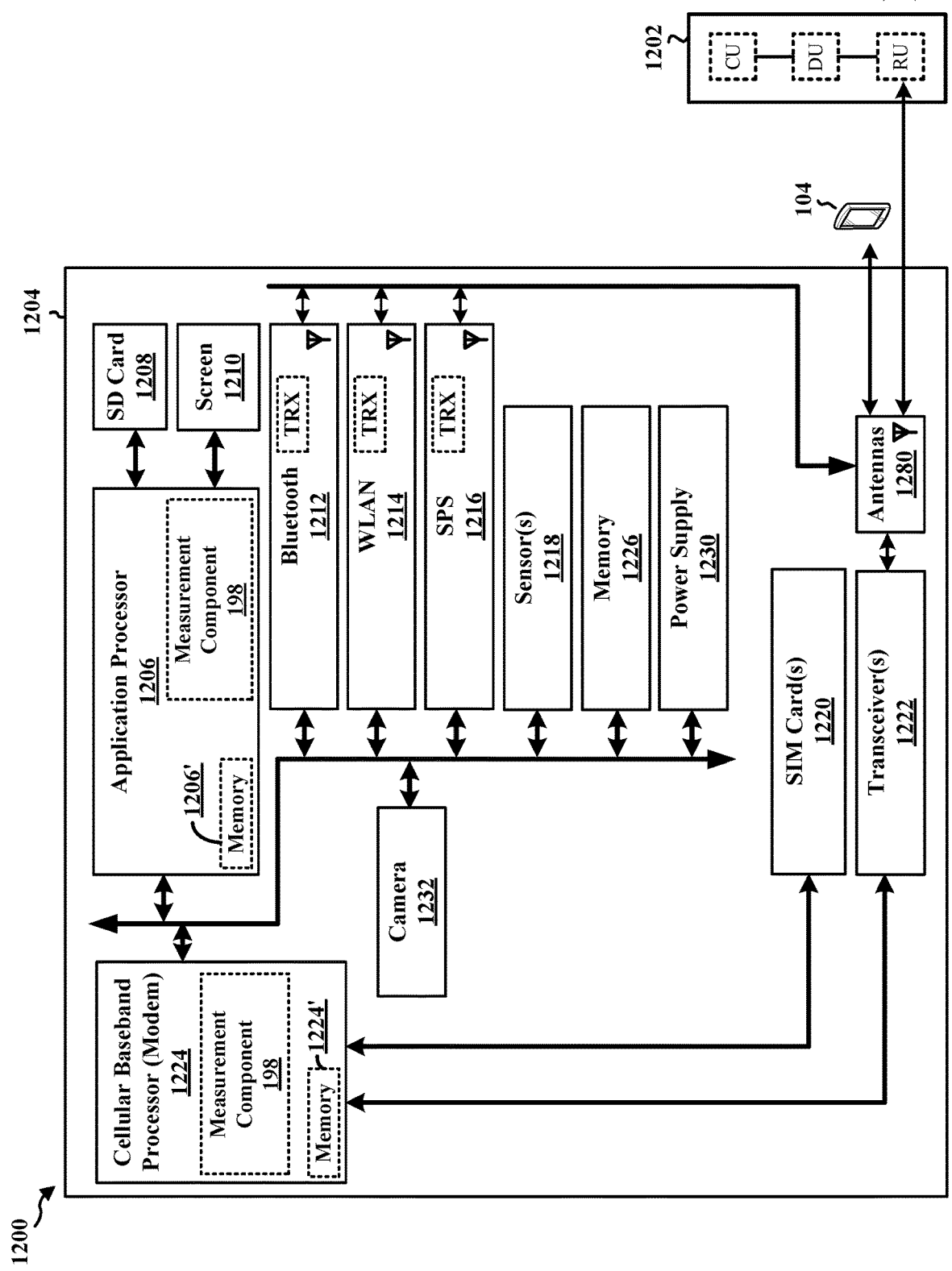
FIG. 12 is a diagram illustrating an example of a hardware implementation for an example apparatus and/or a UE.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed herein, the measurement component 198 is configured to measure a first measurement on a first serving cell or a first serving beam using at least one of a first receiver or a first measurement configuration with a higher gain and a higher power consumption than a second receiver or a second measurement configuration; measure a second measurement on one or more neighbor cells or one or more non-serving beams using at least one of the second receiver or the second measurement configuration with a lower gain and a lower power consumption than the first receiver or the first measurement configuration, the second receiver being different than the first receiver or the second measurement configuration being different than the first measurement configuration; and perform at least one of: transmitting a measurement report to a network node based on the first measurement and the second measurement, selecting a second serving cell or a second serving beam based on the first measurement and the second measurement based on a rank, or ranking cells or beams based on the first measurement and the second measurement.

The measurement component 198 may be further configured to transmit, to the network node, an indication of support of a measurement capability including use of a different receiver or same receiver with a different measurement configuration for the first measurement on the first serving cell or the first serving beam and the second measurement on the one or more neighbor cells or the one or more non-serving beams; and receive a configuration from the network node enabling the measurement capability, wherein the first measurement and the second measurement are based on the configuration. The measurement component 198 may be further configured to receive a request from the network node inquiring if the UE supports the measurement capability including the use of the different receiver or the same receiver and the different measurement configuration for the first measurement on the first serving cell and the second measurement on the one or more neighbor cells or the one or more non-serving beams, wherein the indication of the support is in response to the request. The measurement component 198 may be further configured to transmit, to the network node, the measurement report including the first measurement and the second measurement and indicating an expected gain for the one or more neighbor cells, the expected gain based on the different receiver or the different measurement configuration used for the second measurement of the one or more neighbor cells, wherein the configuration indicates for the UE to report the expected gain with the second measurement. The measurement component 198 may be further configured to adjust the second measurement to account for the different receiver or the different measurement configuration; and transmit, to the network node, the measurement report including the first measurement and an adjusted second measurement, wherein the configuration indicates for the UE to adjust the second measurement for the one or more neighbor cells or the one or more non-serving beams. The measurement component 198 may be further configured to receive a configuration update disabling the measurement capability; and perform the first measurement on the first serving cell or the first serving beam and the second measurement on the one or more neighbor cells or the one or more non-serving beams using the same receiver and a same measurement configuration.

The measurement component 198 may be within the cellular baseband processor 1224, the application processor 1206, or both the cellular baseband processor 1224 and the application processor 1206. The measurement component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for measuring a first measurement on a first serving cell or a first serving beam using at least one of a first receiver or a first measurement configuration with a higher gain and a higher power consumption than a second receiver or a second measurement configuration; means for measuring a second measurement on one or more neighbor cells or one or more non-serving beams using at least one of the second receiver or the second measurement configuration with a lower gain and a lower power consumption than the first receiver or the first measurement configuration, the second receiver being different than the first receiver or the second measurement configuration being different than the first measurement configuration; and means for performing at least one of: transmitting a measurement report to a network node based on the first measurement and the second measurement, selecting a second serving cell or a second serving beam based on the first measurement and the second measurement based on a rank, or ranking cells or beams based on the first measurement and the second measurement. The apparatus 1204 may further includes means for transmitting, to the network node, an indication of support of a measurement capability including use of a different receiver or same receiver with a different measurement configuration for the first measurement on the first serving cell or the first serving beam and the second measurement on the one or more neighbor cells or the one or more non-serving beams; and means for receiving a configuration from the network node enabling the measurement capability, wherein the first measurement and the second measurement are based on the configuration. The apparatus 1204 may further includes means for receiving a request from the network node inquiring if the UE supports the measurement capability including the use of the different receiver or the same receiver and the different measurement configuration for the first measurement on the first serving cell and the second measurement on the one or more neighbor cells or the one or more non-serving beams, wherein the UE transmits the indication of the support in response to the request. The apparatus 1204 may further includes means for transmitting, to the network node, the measurement report including the first measurement and the second measurement and indicating an expected gain for the one or more neighbor cells, the expected gain based on the different receiver or the different measurement configuration used for the second measurement of the one or more neighbor cells, wherein the configuration indicates for the UE to report the expected gain with the second measurement. The apparatus 1204 may further includes means for adjusting the second measurement to account for the different receiver or the different measurement configuration; and means for transmitting, to the network node, the measurement report including the first measurement and an adjusted second measurement, wherein the configuration indicates for the UE to adjust the second measurement for the one or more neighbor cells or the one or more non-serving beams. The apparatus 1204 may further includes means for receiving a configuration update disabling the measurement capability; and means performing the first measurement on the first serving cell or the first serving beam and the second measurement on the one or more neighbor cells or the one or more non-serving beams using the same receiver and a same measurement configuration. The apparatus 1004 may further include means for performing any of the aspects described in connection with the flowchart in FIG. 10, FIG. 11, or the aspects performed by the UE in any of FIGS. 7-9. The means may be the measurement component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
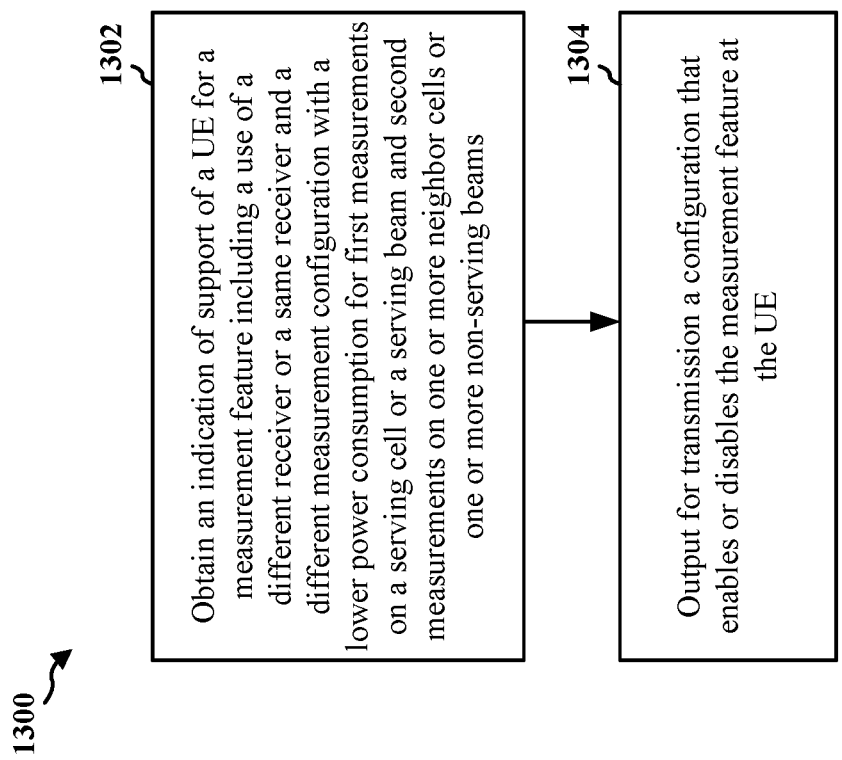
FIG. 13 is a flowchart of a method of wireless communication at a network node, in accordance with various aspects of the present disclosure.

FIG. 13 is a flowchart 1300 of a method of wireless communication. The method may be performed by a network node such as a base station or a component of a base station (e.g., the base station 102, 310, 702, 802, 902; the CU 110; the DU 130; the RU 140; the network entity 1202). The method may enable the network node to coordinate with a UE to allow for reduced power use at the UE for at least a portion of measurements by enabling the UE to perform more accurate measurements that consume more power for a serving cell or a serving beam, and less accurate measurements that consume less power for neighbor cells or non-serving beams. Aspects presented herein enable a coordination between the UE and the network to adjust for refinement gain in order to maintain mobility performance, timely handover, and avoid dropped calls while still allowing for the power reduction at the UE.

At 1302, the network node obtains an indication of support of a UE for a measurement capability (which may be referred to as a measurement feature) including a use of a different receiver or a same receiver and a different measurement configuration with a lower gain and a lower power consumption than a first receiver or a first measurement configuration for first measurements on a serving cell or a serving beam and second measurements on one or more neighbor cells or one or more non-serving beams. The obtaining may be performed, e.g., by the measurement configuration component 199, the transceiver 1546, and/or the antenna 1280 of the network entity 1202, or the base station 102 or 310. As an example, the network node may receive the indication of support, such as in a UE capability message in RRC signaling. The indication may indicate the support for the measurement capability for one or more of intra-frequency neighbor cell measurements, inter-frequency neighbor cell measurements, inter-RAT neighbor cell measurements, or intra-RAT neighbor cell measurements. The first receiver or the first measurement configuration may provide a higher level of accuracy and consume a higher amount of power than a second receiver or a second measurement configuration. FIGS. 7 and 8 illustrates an example of a base station receiving information indicating whether a UE supports such a measurement capability.

At 1304, the network node outputs for transmission a configuration that enables or disables the measurement capability at the UE. As an example, the network node may transmit the configuration that enables the measurement capability for the UE. The transmission may be performed, e.g., by the measurement configuration component 199, the transceiver 1546, and/or the antenna 1280 of the network entity 1202, or the base station 102 or 310. FIGS. 7 and 8 illustrate examples of a base station configuring a UE to enable or disable the measurement capability. The different measurement configuration may include at least one of a different reception beam width parameter, a different interference cancellation parameter, a different gain, a different amount of receive antennas, or a different number of iterations. As an example, the network node may configure the UE to use a wider beam for measuring neighbor cells according to the different measurement configuration and may use a narrower beam for serving cell or serving beam. The network node may configure the UE to perform a higher level of interference cancellation for measurements for a serving cell or serving beam and a lower level of interference cancellation for measurements of a neighbor cell or a non-serving beam. The measurements may have a higher gain for measurements of the serving cell or serving beam and measurements of the neighbor cells or non-serving beams may have a lower gain. The network node may configure the UE to use a larger number of receive antennas for measurements of the serving cell or serving beam and may use a smaller number of receive antennas for measurements of the neighbor cells or non-serving beam. The network node may configure the UE to use a larger number of iterations when receiving a signal to perform measurements of a serving cell or a serving beam and may use a smaller number of iterations when performing measurements of the neighbor cells or non-serving beams. The configuration from the network node may enable or disable the measurement capability for one or more of intra-frequency neighbor cell measurements, inter-frequency neighbor cell measurements, inter-RAT neighbor cell measurements, or intra-RAT neighbor cell measurements. FIGS. 7 and 8 illustrates an example of a base station configuring a UE to enable or disable such measurement configurations.

Figure 14:
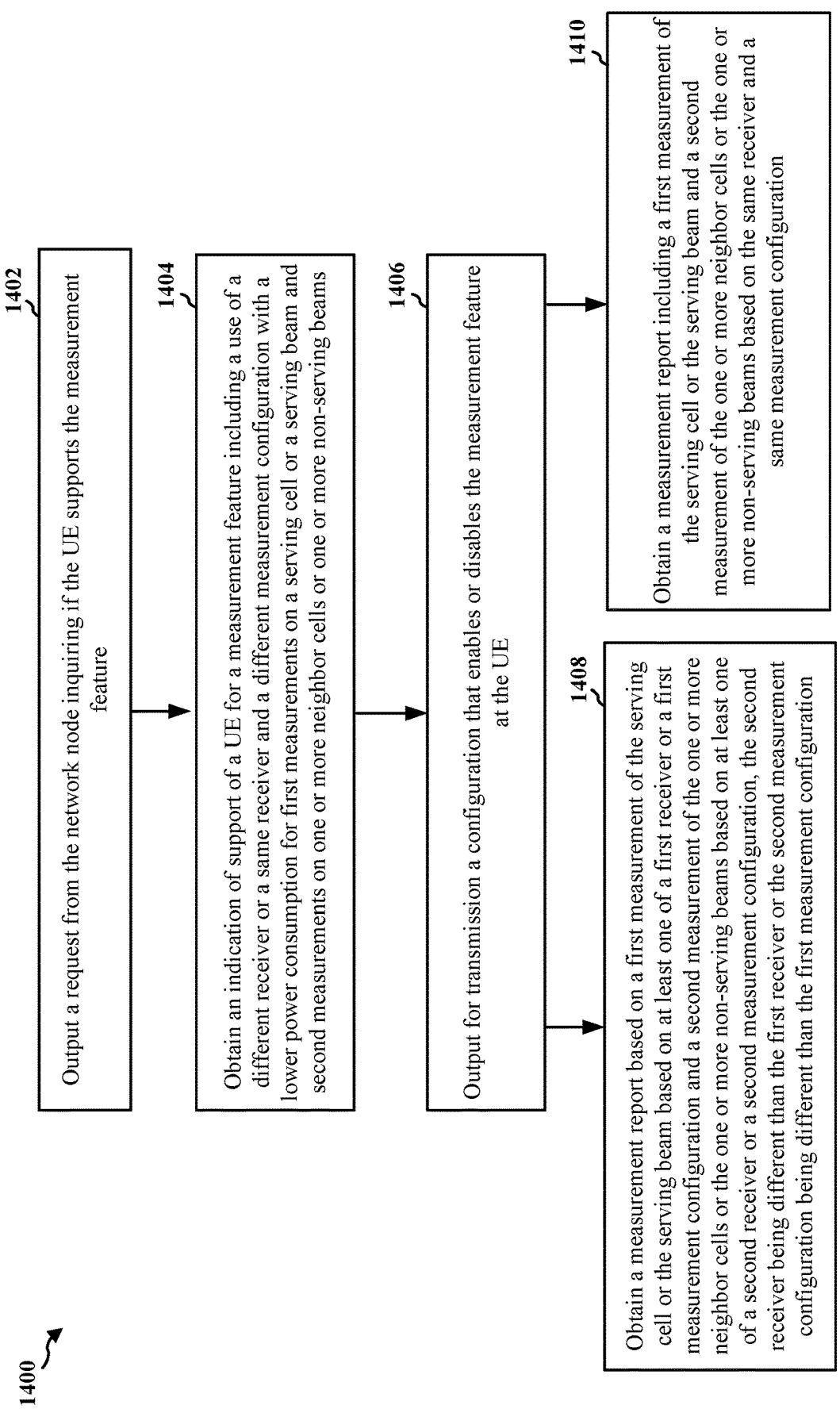
FIG. 14 is a flowchart of a method of wireless communication at a network node, in accordance with various aspects of the present disclosure.

FIG. 14 is a flowchart 1400 of a method of wireless communication. The method may be performed by a network node such as a base station or a component of a base station (e.g., the base station 102, 310, 702, 802; the CU 110; the DU 130; the RU 140; the network entity 1202). The method may enable the network node to coordinate with a UE to allow for reduced power use at the UE for at least a portion of measurements by enabling the UE to perform more accurate measurements that consume more power for a serving cell or a serving beam, and less accurate measurements that consume less power for neighbor cells or non-serving beams. Aspects presented herein enable a coordination between the UE and the network to adjust for refinement gain in order to maintain mobility performance, timely handover, and avoid dropped calls while still allowing for the power reduction at the UE.

At 1404, the network node obtains an indication of support of a UE for a measurement capability (which may be referred to as a measurement feature) including a use of a different receiver or a same receiver and a different measurement configuration with a lower gain and a lower power consumption than a first receiver or a first measurement configuration for first measurements on a serving cell or a serving beam and second measurements on one or more neighbor cells or one or more non-serving beams. The obtaining may be performed, e.g., by the measurement configuration component 199, the transceiver 1546, and/or the antenna 1280 of the network entity 1202, or the base station 102 or 310. As an example, the network node may receive the indication of support, such as in a UE capability message in RRC signaling. The indication may indicate the support for the measurement capability for one or more of intra-frequency neighbor cell measurements, inter-frequency neighbor cell measurements, inter-RAT neighbor cell measurements, or intra-RAT neighbor cell measurements. The first receiver or the first measurement configuration may provide a higher level of accuracy and consume a higher amount of power than a second receiver or a second measurement configuration. FIGS. 7 and 8 illustrate examples of a base station receiving information indicating whether a UE supports such a measurement capability.

At 1406, the network node outputs for transmission a configuration that enables or disables the measurement capability at the UE. As an example, the network node may transmit the configuration that enables the measurement capability for the UE. The transmission may be performed, e.g., by the measurement configuration component 199, the transceiver 1546, and/or the antenna 1280 of the network entity 1202, or the base station 102 or 310. FIGS. 7 and 8 illustrate examples of a base station configuring a UE to enable or disable the measurement capability. The different measurement configuration may include at least one of a different reception beam width parameter, a different interference cancellation parameter, a different gain, a different amount of receive antennas, or a different number of iterations. As an example, the network node may configure the UE to use a wider beam for measuring neighbor cells according to the different measurement configuration and may use a narrower beam for serving cell or serving beam. The network node may configure the UE to perform a higher level of interference cancellation for measurements for a serving cell or serving beam and a lower level of interference cancellation for measurements of a neighbor cell or a non-serving beam. The measurements may have a higher gain for measurements of the serving cell or serving beam and measurements of the neighbor cells or non-serving beams may have a lower gain. The network node may configure the UE to use a larger number of receive antennas for measurements of the serving cell or serving beam and may use a smaller number of receive antennas for measurements of the neighbor cells or non-serving beam. The network node may configure the UE to use a larger number of iterations when receiving a signal to perform measurements of a serving cell or a serving beam and may use a smaller number of iterations when performing measurements of the neighbor cells or non-serving beams. The configuration from the network node may enable or disable the measurement capability for one or more of intra-frequency neighbor cell measurements, inter-frequency neighbor cell measurements, inter-RAT neighbor cell measurements, or intra-RAT neighbor cell measurements. FIGS. 7 and 8 illustrate examples of a base station configuring a UE to enable or disable such measurement configurations.

In some aspects, the configuration enables the measurement capability. At 1408, the network node may obtain a measurement report based on a first measurement of the serving cell or the serving beam based on at least one of a first receiver or a first measurement configuration and a second measurement of the one or more neighbor cells or the one or more non-serving beams based on at least one of a second receiver or a second measurement configuration, the second receiver being different than the first receiver or the second measurement configuration being different than the first measurement configuration. The obtaining may be performed, e.g., by the measurement configuration component 199, the transceiver 1546, and/or the antenna 1280 of the network entity 1202, or the base station 102 or 310. The measurement report received at 1408 may include the first measurement and the second measurement and indicating an expected gain for the one or more neighbor cells, the expected gain based on the different receiver or the same receiver and the different measurement configuration used for the second measurement of the one or more neighbor cells. In some aspects, the configuration, at 1406 may indicate for the UE to report the expected gain with the second measurement. In some aspects, at 1406, the configuration may indicate for the UE to adjust the second measurement for the one or more neighbor cells or the one or more non-serving beams, and the measurement report received at 1408, may include the first measurement and an adjusted second measurement.

In some aspects, the configuration may disable the measurement capability. At 1410, the network node may obtain a measurement report including a first measurement of the serving cell or the serving beam and a second measurement of the one or more neighbor cells or the one or more non-serving beams based on the same receiver and a same measurement configuration. The obtaining may be performed, e.g., by the measurement configuration component 199, the transceiver 1546, and/or the antenna 1280 of the network entity 1202, or the base station 102 or 310.

As illustrated at 1402, in some aspects, the network node may output for transmission a request inquiring if the UE supports the measurement capability including the use of the different receiver or the same receiver and the different measurement configuration for the first measurements on the serving cell or the serving beam and the second measurements on the one or more neighbor cells or the one or more non-serving beams. The network node may obtain the indication of the support in response to the request. The transmission may be performed, e.g., by the measurement configuration component 199, the transceiver 1546, and/or the antenna 1280 of the network entity 1202, or the base station 102 or 310. The request and the indication may be included in UE capability messages, and the configuration is comprised in RRC signaling. FIGS. 7 and 8 illustrate examples of a network node transmitting an inquiry to the UE.

Figure 15:
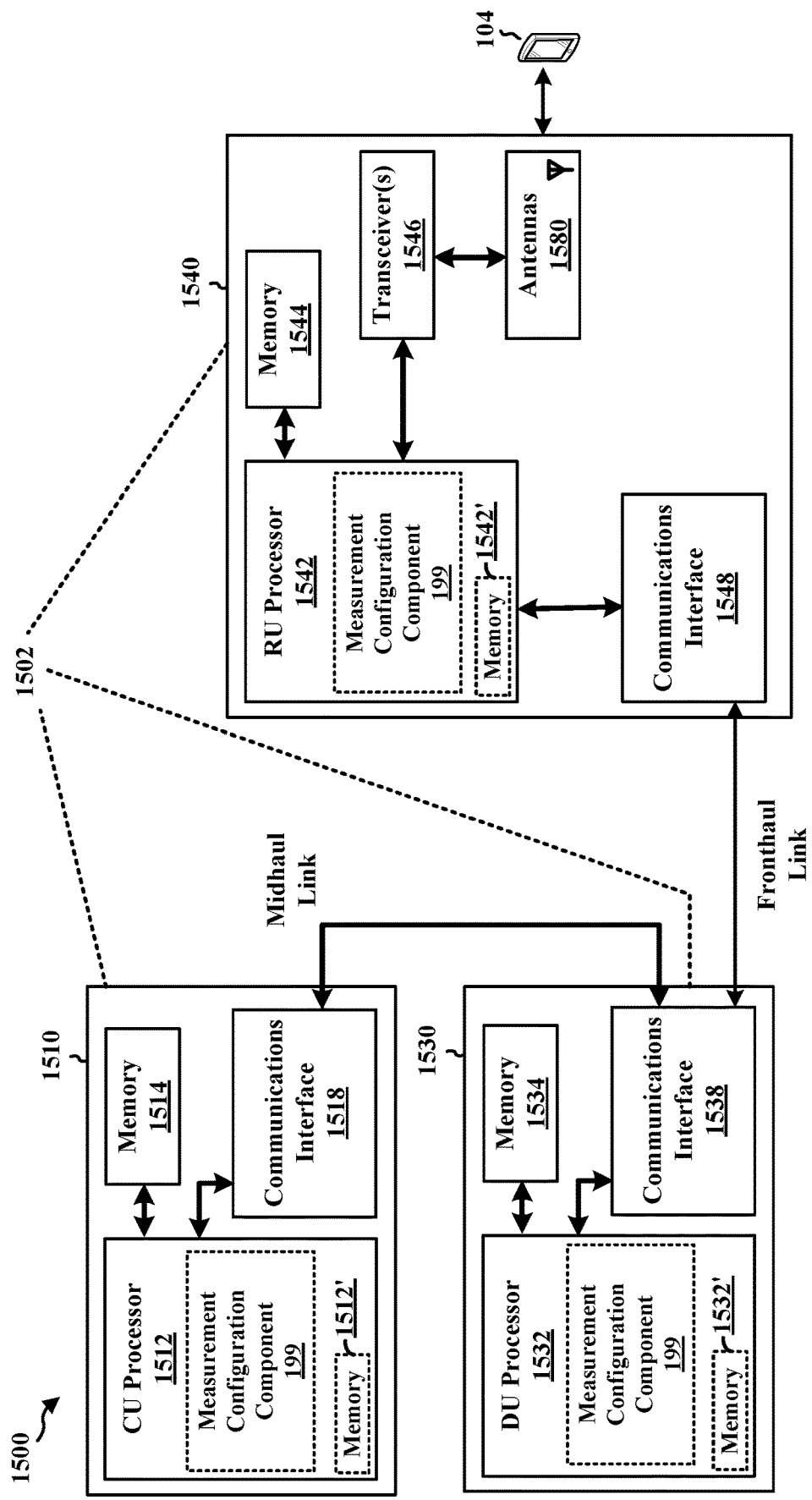
FIG. 15 is a diagram illustrating an example of a hardware implementation for an example network node or network entity.

FIG. 15 is a diagram 1500 illustrating an example of a hardware implementation for a network entity 1502, which may also be referred to as a network node. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, the measurement configuration component 199 is configured to obtain an indication of support of a UE for a measurement capability including a use of a different receiver or a same receiver and a different measurement configuration with a lower gain and a lower power consumption than a first receiver or a first measurement configuration for first measurements on a serving cell or a serving beam and second measurements on one or more neighbor cells or one or more non-serving beams; and output for transmission a configuration that enables or disables the measurement capability at the UE.

The configuration may enable the measurement capability, and the measurement configuration component 199 and/or another component of the network entity 1502 may be configured to obtain a measurement report based on a first measurement of the serving cell or the serving beam based on at least one of a first receiver or a first measurement configuration and a second measurement of the one or more neighbor cells or the one or more non-serving beams based on at least one of a second receiver or a second measurement configuration, the second receiver being different than the first receiver or the second measurement configuration being different than the first measurement configuration, wherein the measurement report includes at least one of: the first measurement and the second measurement and indicating an expected gain for the one or more neighbor cells, the expected gain based on the different receiver or the same receiver and the different measurement configuration used for the second measurement of the one or more neighbor cells, wherein the configuration indicates for the UE to report the expected gain with the second measurement, or the first measurement and an adjusted second measurement and the configuration indicates for the UE to adjust the second measurement for the one or more neighbor cells or the one or more non-serving beams. The configuration may disable the measurement capability, and the measurement configuration component 199 and/or another component of the network entity 1502 may be configured to obtain a measurement report including a first measurement of the serving cell or the serving beam and a second measurement of the one or more neighbor cells or the one or more non-serving beams based on the same receiver and a same measurement configuration. The measurement configuration component 199 and/or another component of the network entity 1502 may be configured to output for transmission a request inquiring if the UE supports the measurement capability including the use of the different receiver or the same receiver and the different measurement configuration for the first measurements on the serving cell or the serving beam and the second measurements on the one or more neighbor cells or the one or more non-serving beams, wherein the indication of the support is in response to the request.

The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1502 may include a variety of components configured for various functions. In one configuration, the network entity 1502 includes means for obtaining an indication of support of a UE for a measurement capability including a use of a different receiver or a same receiver and a different measurement configuration with a lower gain and a lower power consumption than a first receiver or a first measurement configuration for first measurements on a serving cell or a serving beam and second measurements on one or more neighbor cells or one or more non-serving beams; and means for outputting for transmission a configuration that enables or disables the measurement capability at the UE. The configuration may enable the measurement capability, and the network entity 1502 may further include means for obtaining a measurement report based on a first measurement of the serving cell or the serving beam based on at least one of a first receiver or a first measurement configuration and a second measurement of the one or more neighbor cells or the one or more non-serving beams based on at least one of a second receiver or a second measurement configuration, the second receiver being different than the first receiver or the second measurement configuration being different than the first measurement configuration, wherein the measurement report includes at least one of: the first measurement and the second measurement and indicating an expected gain for the one or more neighbor cells, the expected gain based on the different receiver or the same receiver and the different measurement configuration used for the second measurement of the one or more neighbor cells, wherein the configuration indicates for the UE to report the expected gain with the second measurement, or the first measurement and an adjusted second measurement and the configuration indicates for the UE to adjust the second measurement for the one or more neighbor cells or the one or more non-serving beams. The configuration may disable the measurement capability, and the network entity 1502 may further include means for obtaining a measurement report including a first measurement of the serving cell or the serving beam and a second measurement of the one or more neighbor cells or the one or more non-serving beams based on the same receiver and a same measurement configuration. The network entity 1502 may further include means for outputting for transmission a request inquiring if the UE supports the measurement capability including the use of the different receiver or the same receiver and the different measurement configuration for the first measurements on the serving cell or the serving beam and the second measurements on the one or more neighbor cells or the one or more non-serving beams, wherein the indication of the support is in response to the request. The network entity 1502 may further include means for performing any of the aspects described in connection with FIG. 13, 14, and/or the aspects performed by the base station in FIG. 7 or FIG. 8. The means may be the measurement configuration component 199 of the network entity 1502 configured to perform the functions recited by the means. As described herein, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: measuring a first measurement on a first serving cell or a first serving beam using at least one of a first receiver or a first measurement configuration with a higher gain and a higher power consumption than a second receiver or a second measurement configuration; measuring a second measurement on one or more neighbor cells or one or more non-serving beams using at least one of the second receiver or the second measurement configuration with a lower gain and a lower power consumption than the first receiver or the first measurement configuration, the second receiver being different than the first receiver or the second measurement configuration being different than the first measurement configuration; and performing at least one of: transmitting a measurement report to a network node based on the first measurement and the second measurement, selecting a second serving cell or a second serving beam based on the first measurement and the second measurement based on a rank, or ranking cells or beams based on the first measurement and the second measurement.

In aspect 2, the method of aspect 1 further includes transmitting, to the network node, an indication of support of a measurement capability including use of a different receiver or same receiver with a different measurement configuration for the first measurement on the first serving cell or the first serving beam and the second measurement on the one or more neighbor cells or the one or more non-serving beams; and receiving a configuration from the network node enabling and configuring the measurement capability, wherein the first measurement and the second measurement are based on the configuration.

In aspect 3, the method of aspect 2 further includes that the different measurement configuration includes at least one of: a different reception beam width parameter, a different interference cancellation, a different gain, a different amount of receive antennas, or a different number of iterations.

In aspect 4, the method of aspect 2 or aspect 3 further includes that the indication indicates the support for the measurement capability for one or more of intra-frequency neighbor cell measurements, inter-frequency neighbor cell measurements, inter-RAT neighbor cell measurements, or intra-RAT neighbor cell measurements.

In aspect 5, the method of any of aspects 2-4 further includes that the configuration from the network node enables or disables the measurement capability for one or more of intra-frequency neighbor cell measurements, inter-frequency neighbor cell measurements, inter-RAT neighbor cell measurements, or intra-RAT neighbor cell measurements.

In aspect 6, the method of any of aspects 2-5 further includes receiving a request from the network node inquiring if the UE supports the measurement capability including the use of the different receiver or the same receiver and the different measurement configuration for the first measurement on the first serving cell and the second measurement on the one or more neighbor cells or the one or more non-serving beams, wherein the UE transmits the indication of the support in response to the request.

In aspect 7, the method of aspect 6 further includes that the request is comprised in a UE capability inquiry message, the indication is comprised in a UE capability message, and the configuration is comprised in RRC signaling.

In aspect 8, the method of any of aspects 2-7 further includes transmitting, to the network node, the measurement report including the first measurement and the second measurement and indicating an expected gain for the one or more neighbor cells, the expected gain based on the different receiver or the different measurement configuration used for the second measurement of the one or more neighbor cells.

In aspect 9, the method of aspect 8 further includes that the configuration indicates for the UE to report the expected gain if using a first receiver or a gain difference between the first receiver and a second receiver with the second measurement with the second measurement.

In aspect 10, the method of any of aspects 2-7 further includes adjusting the second measurement with the gain difference to account for the different receiver or the different measurement configuration; and transmitting, to the network node, the measurement report including the first measurement and an adjusted second measurement.

In aspect 11, the method of aspect 10 further includes that the configuration indicates for the UE to adjust the second measurement for the one or more neighbor cells or the one or more non-serving beams.

In aspect 12, the method of any of aspects 1-11 further includes that the first receiver or the first measurement configuration provides a higher level of accuracy and consumes a higher amount of power than the second receiver or the second measurement configuration.

In aspect 13, the method of any of aspects 1-12 further includes receiving a configuration update disabling the measurement capability; and performing the first measurement on the first serving cell or the first serving beam and the second measurement on the one or more neighbor cells or the one or more non-serving beams using the same receiver and a same measurement configuration.

In aspect 14, the method of any of aspects 1-13 further includes that the UE is in an RRC inactive mode or an RRC idle mode, and the UE selects or reselects the second serving cell or the second serving beam based on the first measurement and the second measurement or ranks the cells based on the first measurement and the second measurement.

Aspect 15 is an apparatus for wireless communication at a UE, the apparatus including means for performing the method of any of aspects 1-14.

Aspect 16 is an apparatus for wireless communication at a UE, the apparatus including memory; and at least one processor coupled to the memory and configured, based at least in part on information stored in the memory, to perform the method of any of aspects 1-14.

In aspect 17, the apparatus of aspect 15 or aspect 16 further includes at least one of a transceiver coupled to the at least one processor or an antenna coupled to the at least one processor and configured to receive a signal from at least one of the first serving cell, the first serving beam, the one or more neighbor cells or the one or more non-serving beams.

Aspect 18 is a non-transitory computer-readable medium storing computer executable code, the code when executed by at least one processor cause the at least one processor to perform the method of any of aspects 1-14.

Aspect 19 is a method of wireless communication at a network node, including: obtaining an indication of support of a UE for a measurement capability including a use of a different receiver or a same receiver and a different measurement configuration with a lower gain and a lower power consumption than a first receiver or a first measurement configuration for first measurements on a serving cell or a serving beam and second measurements on one or more neighbor cells or one or more non-serving beams; and outputting for transmission a configuration that enables or disables the measurement capability at the UE.

In aspect 20, the method of aspect 19 further includes that the different measurement configuration includes at least one of: a different reception beam width parameter, a different interference cancellation, a different gain, a different amount of receive antennas, or a different number of iterations.

In aspect 21, the method of aspect 19 or 20 further includes that the indication indicates the support for the measurement capability for one or more of intra-frequency neighbor cell measurements, inter-frequency neighbor cell measurements, inter-RAT neighbor cell measurements, or intra-RAT neighbor cell measurements.

In aspect 22, the method of any of aspects 19-21 further includes that the configuration from the network node enables or disables the measurement capability for one or more of intra-frequency neighbor cell measurements, inter-frequency neighbor cell measurements, inter-RAT neighbor cell measurements, or intra-RAT neighbor cell measurements.

In aspect 23, the method of any of aspects 19-22 further includes that the configuration enables the measurement capability, the method further comprising: obtaining a measurement report based on a first measurement of the serving cell or the serving beam based on at least one of a first receiver or a first measurement configuration and a second measurement of the one or more neighbor cells or the one or more non-serving beams based on at least one of a second receiver or a second measurement configuration, the second receiver being different than the first receiver or the second measurement configuration being different than the first measurement configuration.

In aspect 24, the method of aspect 23 further includes that the measurement report includes the first measurement and the second measurement and indicating an expected gain for the one or more neighbor cells, the expected gain based on the different receiver or the same receiver and the different measurement configuration used for the second measurement of the one or more neighbor cells.

In aspect 25, the method of aspect 24 further includes that the configuration indicates for the UE to report the expected gain with the second measurement.

In aspect 26, the method of aspect 23 further includes that the configuration indicates for the UE to adjust the second measurement for the one or more neighbor cells or the one or more non-serving beams, and wherein the measurement report includes the first measurement and an adjusted second measurement.

In aspect 27, the method of any of aspects 19-22 further includes that the configuration disables the measurement capability, the method further comprising: obtaining a measurement report including a first measurement of the serving cell or the serving beam and a second measurement of the one or more neighbor cells or the one or more non-serving beams based on the same receiver and a same measurement configuration.

In aspect 28, the method of any of aspects 19-27 further includes outputting for transmission a request inquiring if the UE supports the measurement capability including the use of the different receiver or the same receiver and the different measurement configuration for the first measurements on the serving cell or the serving beam and the second measurements on the one or more neighbor cells or the one or more non-serving beams, wherein the network node obtains the indication of the support in response to the request.

In aspect 29, the method of aspect 28 further includes that the request and the indication are comprised in UE capability messages, and the configuration is comprised in RRC signaling.

In aspect 30, the method of any of aspects 19-29 further includes that a first receiver or a first measurement configuration provides a higher level of accuracy and consumes a higher amount of power than a second receiver or a second measurement configuration.

Aspect 31 is an apparatus for wireless communication at a network node, the apparatus including means for performing the method of any of aspects 19-30.

Aspect 32 is an apparatus for wireless communication at a network node, the apparatus including memory; and at least one processor coupled to the memory and configured, based at least in part on information stored in the memory, to perform the method of any of aspects 19-30.

In aspect 33, the apparatus of aspect 31 or aspect 32 further includes at least one of a transceiver coupled to the at least one processor or an antenna coupled to the at least one processor and configured to receive the indication or to transmit the configuration.

Aspect 34 is a non-transitory computer-readable medium storing computer executable code, the code when executed by at least one processor cause the at least one processor to perform the method of any of aspects 19-30.

What is claimed is:

1. An apparatus for wireless communication at a user equipment (UE), including:
    memory; and
    at least one processor coupled to the memory and, based at least in part on information stored in the memory, configured to:
        measure a first measurement on a first serving cell or a first serving beam using a first measurement configuration with a higher gain and a higher power consumption than a second measurement configuration;
        measure a second measurement on one or more neighbor cells or one or more non-serving beams using the second measurement configuration with a lower gain and a lower power consumption than the first measurement configuration, the second measurement configuration being different than the first measurement configuration; and
        perform at least one of:
            transmit a measurement report to a network node based on the first measurement and the second measurement,
            select a second serving cell or a second serving beam based on the first measurement and the second measurement based on a rank, or
            rank cells or beams based on the first measurement and the second measurement.

2. The apparatus of claim 1, wherein the at least one processor is further configured to:
    transmit, to the network node, an indication of support of a measurement capability including use of a same receiver with a different measurement configuration for the first measurement on the first serving cell or the first serving beam and the second measurement on the one or more neighbor cells or the one or more non-serving beams; and
    receive a configuration from the network node enabling and configuring the measurement capability, wherein the first measurement and the second measurement are based on the configuration.

3. The apparatus of claim 2, wherein the different measurement configuration includes at least one of:
    a different reception beam width parameter,
    a different interference cancellation,
    a different gain,
    a different amount of receive antennas, or
    a different number of iterations.

4. The apparatus of claim 2, wherein at least one of:
    the indication indicates the support for the measurement capability for one or more of intra-frequency neighbor cell measurements, inter-frequency neighbor cell measurements, inter-radio access technology (inter-RAT) neighbor cell measurements, or intra-radio access technology (intra-RAT) neighbor cell measurements, or
    the configuration from the network node enables or disables the measurement capability for one or more of the intra-frequency neighbor cell measurements, the inter-frequency neighbor cell measurements, the inter-RAT neighbor cell measurements, or the intra-RAT neighbor cell measurements.

5. The apparatus of claim 2, wherein the at least one processor is further configured to:
    receive a request from the network node inquiring if the UE supports the measurement capability including the use of the same receiver and the different measurement configuration for the first measurement on the first serving cell and the second measurement on the one or more neighbor cells or the one or more non-serving beams, wherein the indication of the support is in response to the request.

6. The apparatus of claim 2, wherein the at least one processor is further configured to:
    transmit, to the network node, the measurement report including the first measurement and the second measurement and indicating an expected gain for the one or more neighbor cells, the expected gain based on the different measurement configuration used for the second measurement of the one or more neighbor cells.

7. The apparatus of claim 2, wherein the at least one processor is further configured to:
    adjust the second measurement with a gain difference to account for the different measurement configuration; and
    transmit, to the network node, the measurement report including the first measurement and an adjusted second measurement, wherein the configuration indicates for the UE to adjust the second measurement for the one or more neighbor cells or the one or more non-serving beams.

8. The apparatus of claim 2, wherein the at least one processor is further configured to:
    receive a configuration update disabling the measurement capability; and
    perform the first measurement on the first serving cell or the first serving beam and the second measurement on the one or more neighbor cells or the one or more non-serving beams using the same receiver and a same measurement configuration.

9. The apparatus of claim 1, wherein the UE is in a radio resource control (RRC) inactive mode or an RRC idle mode, and the at least one processor is configured to select or reselect the second serving cell or the second serving beam based on the first measurement and the second measurement or rank cells based on the first measurement and the second measurement.

10. The apparatus of claim 1, further comprising at least one of:

a transceiver coupled to the at least one processor and configured to receive a signal from at least one of the first serving cell, the first serving beam, the one or more neighbor cells or the one or more non-serving beams, or an antenna coupled to the at least one processor and configured to receive the signal from at least one of the first serving cell, the first serving beam, the one or more neighbor cells or the one or more non-serving beams.

11. A method of wireless communication at a user equipment (UE), including:
measuring a first measurement on a first serving cell or a first serving beam using a first measurement configuration with a higher power consumption than a second measurement configuration;
measuring a second measurement on one or more neighbor cells or one or more non-serving beams using the second measurement configuration with a lower gain and a lower power consumption than the first measurement configuration, the second measurement configuration being different than the first measurement configuration; and
performing at least one of:
transmitting a measurement report to a network node based on the first measurement and the second measurement,
selecting a second serving cell or a second serving beam based on the first measurement and the second measurement based on a rank, or
ranking cells or beams based on the first measurement and the second measurement.

12. The method of claim 11, further comprising:
transmitting, to the network node, an indication of support of a measurement capability including use of a same receiver with a different measurement configuration for the first measurement on the first serving cell or the first serving beam and the second measurement on the one or more neighbor cells or the one or more non-serving beams; and
receiving a configuration from the network node enabling and configuring the measurement capability, wherein the first measurement and the second measurement are based on the configuration.

13. The method of claim 12, wherein the different measurement configuration includes at least one of:
a different reception beam width parameter,
a different interference cancellation,
a different gain,
a different amount of receive antennas, or
a different number of iterations.

14. The method of claim 12, wherein at least one of:
the indication indicates the support for the measurement capability for one or more of intra-frequency neighbor cell measurements, inter-frequency neighbor cell measurements, inter-radio access technology (inter-RAT) neighbor cell measurements, or intra-radio access technology (intra-RAT) neighbor cell measurements, or
the configuration from the network node enables or disables the measurement capability for one or more of the intra-frequency neighbor cell measurements, the inter-frequency neighbor cell measurements, the inter-RAT neighbor cell measurements, or the intra-RAT neighbor cell measurements.

15. The method of claim 12, further comprising:
receiving a request from the network node inquiring if the UE supports the measurement capability including the use of the same receiver and the different measurement configuration for the first measurement on the first serving cell and the second measurement on the one or more neighbor cells or the one or more non-serving beams,
wherein the UE transmits the indication of the support in response to the request.

16. The method of claim 12, further comprising:
transmitting, to the network node, the measurement report including the first measurement and the second measurement and indicating an expected gain for the one or more neighbor cells, the expected gain based on the different measurement configuration used for the second measurement of the one or more neighbor cells.

17. The method of claim 12, further comprising:
adjusting the second measurement with a gain difference to account for the different measurement configuration; and
transmitting, to the network node, the measurement report including the first measurement and an adjusted second measurement, wherein the configuration indicates for the UE to adjust the second measurement for the one or more neighbor cells or the one or more non-serving beams.

18. The method of claim 12, further comprising:
receiving a configuration update disabling the measurement capability; and
performing the first measurement on the first serving cell or the first serving beam and the second measurement on the one or more neighbor cells or the one or more non-serving beams using the same receiver and a same measurement configuration.

19. The method of claim 11, wherein the UE is in a radio resource control (RRC) inactive mode or an RRC idle mode, and the UE selects the second serving cell or the second serving beam based on the first measurement and the second measurement or ranks the cells based on the first measurement and the second measurement.

20. An apparatus for wireless communication at a network node, including:
memory; and
at least one processor coupled to the memory and, based at least in part on information stored in the memory, configured to:
obtain an indication of support of a user equipment (UE) for a measurement capability including a use of a same receiver and a different measurement configuration with a lower gain and a lower power consumption than a first measurement configuration for first measurements on a serving cell or a serving beam and second measurements on one or more neighbor cells or one or more non-serving beams; and
output for transmission a configuration that enables or disables the measurement capability at the UE.

21. The apparatus of claim 20, further comprising:
at least one of a transceiver coupled to the at least one processor or an antenna coupled to the at least one processor, wherein the different measurement configuration includes at least one of:
a different reception beam width parameter,
a different interference cancellation,
a different gain,
a different amount of receive antennas, or
a different number of iterations.

22. The apparatus of claim 20, wherein at least one of:
the indication indicates the support for the measurement capability for one or more of intra-frequency neighbor cell measurements, inter-frequency neighbor cell measurements, inter-radio access technology (inter-RAT) neighbor cell measurements, or intra-radio access technology (intra-RAT) neighbor cell measurements, or the configuration from the network node enables or disables the measurement capability for one or more of the intra-frequency neighbor cell measurements, the inter-frequency neighbor cell measurements, the inter-RAT neighbor cell measurements, or the intra-RAT neighbor cell measurements.

23. The apparatus of claim 20, wherein the configuration enables the measurement capability, the at least one processor being further configured to:

obtain a measurement report based on a first measurement of the serving cell or the serving beam based on the first measurement configuration and a second measurement of the one or more neighbor cells or the one or more non-serving beams based on a second measurement configuration, the second measurement configuration being different than the first measurement configuration, wherein the measurement report includes at least one of:

the first measurement and the second measurement and indicating an expected gain for the one or more neighbor cells, the expected gain based on the same receiver and the different measurement configuration used for the second measurement of the one or more neighbor cells, wherein the configuration indicates for the UE to report the expected gain with the second measurement, or the first measurement and an adjusted second measurement and the configuration indicates for the UE to adjust the second measurement for the one or more neighbor cells or the one or more non-serving beams.

24. The apparatus of claim 20, wherein the configuration disables the measurement capability, the at least one processor being further configured to:

obtain a measurement report including a first measurement of the serving cell or the serving beam and a second measurement of the one or more neighbor cells or the one or more non-serving beams based on the same receiver and a same measurement configuration.

25. The apparatus of claim 20, wherein the at least one processor is further configured to:

output for transmission a request inquiring if the UE supports the measurement capability including the use of the same receiver and the different measurement configuration for the first measurements on the serving cell or the serving beam and the second measurements on the one or more neighbor cells or the one or more non-serving beams, wherein the indication of the support is in response to the request.

26. A method of wireless communication at a network node, including:

obtaining an indication of support of a user equipment (UE) for a measurement capability including a same receiver and a different measurement configuration with a lower gain and a lower power consumption than a first measurement configuration for first measurements on a serving cell or a serving beam and second measurements on one or more neighbor cells or one or more non-serving beams; and outputting for transmission a configuration that enables or disables the measurement capability at the UE.

27. The method of claim 26, wherein the different measurement configuration includes at least one of:
a different reception beam width parameter,
a different interference cancellation,
a different gain,
a different amount of receive antennas, or
a different number of iterations.

28. The method of claim 26, wherein at least one of:
the indication indicates the support for the measurement capability for one or more of intra-frequency neighbor cell measurements, inter-frequency neighbor cell measurements, inter-radio access technology (inter-RAT) neighbor cell measurements, or intra-radio access technology (intra-RAT) neighbor cell measurements, or the configuration from the network node enables or disables the measurement capability for one or more of the intra-frequency neighbor cell measurements, the inter-frequency neighbor cell measurements, the inter-RAT neighbor cell measurements, or the intra-RAT neighbor cell measurements.

29. The method of claim 26, wherein the configuration enables the measurement capability, the method further comprising:

obtaining a measurement report based on a first measurement of the serving cell or the serving beam based on the first measurement configuration and a second measurement of the one or more neighbor cells or the one or more non-serving beams based on a second measurement configuration, the second measurement configuration being different than the first measurement configuration, wherein the measurement report includes at least one of:

the first measurement and the second measurement and indicating an expected gain for the one or more neighbor cells, the expected gain based on the same receiver and the different measurement configuration used for the second measurement of the one or more neighbor cells, wherein the configuration indicates for the UE to report the expected gain with the second measurement, or the first measurement and an adjusted second measurement and the configuration indicates for the UE to adjust the second measurement for the one or more neighbor cells or the one or more non-serving beams.

30. The method of claim 26, wherein the configuration disables the measurement capability, the method further comprising:

obtaining a measurement report including a first measurement of the serving cell or the serving beam and a second measurement of the one or more neighbor cells or the one or more non-serving beams based on the same receiver and a same measurement configuration.

* * * * *